United States Patent [19]

Kuipers

[11] 4,298,874
[45] Nov. 3, 1981

[54] METHOD AND APPARATUS FOR TRACKING OBJECTS

[75] Inventor: Jack Kuipers, Grand Rapids, Mich.

[73] Assignee: The Austin Company, Cleveland, Ohio

[21] Appl. No.: 954,126

[22] Filed: Oct. 24, 1978

Related U.S. Application Data

[63] Continuation-in-part of Ser. No. 759,723, Jan. 17, 1977, abandoned, which is a continuation-in-part of Ser. No. 733,353, Oct. 18, 1976, abandoned, and a continuation-in-part of Ser. No. 952,263, Oct. 18, 1978, abandoned, which is a continuation of Ser. No. 759,723.

[51] Int. Cl.³ .................................................. G01S 3/02
[52] U.S. Cl. ............................ 343/112 R; 343/112 D
[58] Field of Search ........ 343/100 R, 112 D, 100 CS, 343/112 R

[56]      References Cited
        U.S. PATENT DOCUMENTS

| | | | |
|---|---|---|---|
| 2,432,858 | 12/1947 | Brown . | |
| 2,927,734 | 3/1960 | Vance . | |
| 3,103,663 | 9/1963 | Parker | 343/108 |
| 3,133,283 | 5/1964 | Ghose | 343/100 |
| 3,187,169 | 6/1965 | Trammell, Jr. et al. . | |
| 3,354,459 | 11/1967 | Schwartz et al. | 343/100 |
| 3,526,886 | 9/1970 | Lubich . | |
| 3,529,682 | 9/1970 | Coyne . | |
| 3,560,977 | 2/1971 | Cayzac | 343/100 |
| 3,589,454 | 6/1971 | Coyne . | |
| 3,656,161 | 4/1972 | MacPherson | 343/100 PE |
| 3,712,391 | 1/1973 | Coyne . | |
| 3,731,752 | 5/1973 | Schad . | |
| 3,868,565 | 2/1975 | Kuipers | 324/34 R |
| 3,900,878 | 4/1975 | Tsao | 343/112 R |
| 3,906,504 | 9/1975 | Guster et al. | 343/112 R |
| 3,983,474 | 9/1976 | Kuipers | 324/43 R |
| 4,017,858 | 4/1977 | Kuipers | 343/100 R |
| 4,054,881 | 10/1977 | Raab | 343/112 R |
| 4,072,200 | 2/1978 | Morris et al. . | |
| 4,163,977 | 8/1979 | Polstorff | 343/112 R |
| 4,197,855 | 4/1980 | Lewin . | |
| 4,208,024 | 6/1980 | Killpatrick et al. . | |

FOREIGN PATENT DOCUMENTS 658759 10/1951 United Kingdom .
684229 10/1952 United Kingdom .
724031 2/1955 United Kingdom .
755886 8/1956 United Kingdom .
965326 7/1964 United Kingdom .
1111768 5/1968 United Kingdom .
1157899 7/1969 United Kingdom .

Primary Examiner—Theodore M. Blum
Attorney, Agent, or Firm—Price, Heneveld, Huizenga & Cooper

[57]      ABSTRACT

Two spaced bodies, each including at least two independently oriented radiating antennas, are in communication with each other by such means as an electromagnetic field. The first body receives radiation transmitted from the second body and establishes the pointing angles to the second body with respect to the first body coordinate reference frame. The field received by the first body can include information defining the second body's pointing angles to the first body with respect to the second body's coordinate reference frame and the relative roll about their mutually aligned pointing axis. These pointing angles and relative roll are sufficient for determining the orientation of the first body relative to the second body. The second body receives radiation transmitted from the first body and establishes the pointing angles to the first body with respect to the second body. Analogously, radiation received by the second body can include information defining the first body's pointing angles with respect to the first body coordinate reference frame to the second body and the relative roll between their mutually aligned pointing axes. As before, this information is sufficient for the second body to determine its orientation relative to the first body. Distance between the two bodies can be determined by phase-locking techniques, thus providing the capability of a full six-degree-of-freedom measurement system.

A third body, known and defined in the coordinate frame of the first body, can be defined at the second body with respect to the frame of the second body. That is, information is transmitted from the first body and received at the second body which establishes a vector from the second body to the third body thus defining the location of the third body at the second body.

70 Claims, 19 Drawing Figures

METHOD AND APPARATUS FOR TRACKING OBJECTS

CROSS-REFERENCE TO RELATED APPLICATION

This application is a continuation-in-part of copending U.S. patent application, Ser. No. 759,723, filed Jan. 17, 1977 now abandoned, which was a continuation-in-part of then copending U.S. patent application, Ser. No. 733,353, filed Oct. 18, 1976 now abandoned. This application is also a continuation-in-part of copending U.S. patent application, Ser. No. 952,263, filed Oct. 18, 1978 now abandoned, the last application being a continuation of the said application Ser. No. 759,723.

BACKGROUND OF THE INVENTION

1. Field of the Invention

This invention relates to determining the relative positions of two or more objects; and, more particularly, to radiating field from each object, detecting the field at a second object and analyzing the field to determine the position of the radiating object, and, if desired, the position of a third object.

2. Description of the Prior Art

The use of orthogonal coils for generating and sensing magnetic fields is known. Such apparatus, for example, has received wide attention in the area of mapping magnetic fields to provide a better understanding of their characteristics. If a magnetic field around generating coils can be very accurately mapped through use of sensing coils, it has also been perceived that it might be possible to determine the location of the sensing coils relative to the generating coils based on what is sensed. However, a problem associated with doing this is that there is more than one location and/or orientation within a usual magnetic dipole field that will provide the same characteristic sensing signals in a sensing coil. In order to use a magnetic field for this purpose, additional information must therefore be provided.

One approach to provide the additional information required for this purpose is to have the generating and sensing coils move with respect to each other, such as is taught in U.S. Pat. No. 3,644,825, issued Feb. 22, 1972. The motion of the coils generates changes in the magnetic field, and the resulting signals then may be used to determine direction of the movement or the relative position of the generating and sensing coils. While such an approach removes some ambiguity about the position on the basis of the field sensed, its accuracy is dependent on the relative motion, and it cannot be used at all without the relative motion.

The Kalmus approach is somewhat different in his U.S. Pat. No. 3,121,228, entitled DIRECTION INDICATOR, issued Feb. 11, 1964. In this patent, one object is equipped with perpendicular transmitter coils excited by phase-quadratured alternating current. The other object is equipped with similarly positioned receiver coils, the phase difference between the voltages induced in the receiver coils varying with the angle between the axes of the transmitter and receiver coils and the sum of the voltages induced in the receiver coils indicating the distance between the objects. The apparatus disclosed in this patent, however, is capable of providing two-dimensional distance and direction only, is limited to near-field ranges and provides non-ambiguous information only so long as the relative physical rotation between the objects does not exceed 90 degrees. See, also, Kalmus, *A New Guiding and Tracking System*, IRE Transactions on Aerospace and Navigational Electronics, March 1962, pages 7–10.

U.S. Pat. No. 3,868,565, issued Feb. 25, 1975, to the instant inventor, teaches a tracking system for continuously determining at the origin of a reference coordinate system the relative translation and orientation of a remote object. The tracking system includes radiating and sensing antenna arrays each having three orthogonally positioned loops. Properly controlled excitation of the radiating antenna array allows the instantaneous composite radiated electromagnetic field to be equivalent to that of a single loop or equivalent stub antenna oriented in any desired direction. Further, control of the excitation causes the radiated field to nutate about an axis denoted a pointing vector.

The tracking system is operated as a closed loop system with a computer controlling the radiated field orientation and interpreting the measurements made at the sensing antenna array. That is, an information feedback loop from the sensing antenna array to the radiating antenna array provides information for pointing the axis of the nutating field toward the sensing antenna array. Accordingly, the pointing vector gives the direction to the sensing antenna array from the radiating antenna array. The proper orientation of the pointing vector is necessary for computation of the orientation of the remote object. The signals detected at the sensing antenna include a nutation component. The nutating field produces a different nutation component in the signals detected in each of the three orthogonal loops of the sensing antenna array. The orientation of the sensing antenna array relative to the radiated signal is determined from the relative magnitudes and phase of these modulation components.

SUMMARY OF THE INVENTION

While the art of determining position and orientation of remote objects has received considerable attention, there remains a need to determine the relative position and orientation of a first object with respect to a second remote object without requiring hard wire feedback between the two objects and also without imposing movement and orientation constraints on the remote object or the radiated electromagnetic field. While this need is partially solved by the teachings of commonly assigned U.S. Pat. No. 4,054,881, to Raab, the same maturing from an application which was copending with the parents of the present application, the solution therein presented is applicable to near-field conditions only.

Further, there is a need for continuously and simultaneously determining at a plurality of objects the relative positions and orientation of the objects with respect to each other.

There is a need, finally, for the ability to transfer accurately and quickly from a first object to a second object the position of a third object known to the first object and/or to utilize third-object directions known commonly to the first and second objects to determine range to the third object.

The fulfillment of these needs is the purpose of the apparatus and method which form the subjects of this invention. The present invention, more specifically, encompasses apparatus for and the method of radiating a first vector field from a first body or object, the field having components receivable at a second body and processable to produce at least five independent measurements from which the second body can compute the direction to the first body and the rotation of the first body coordinate frame with respect to its own coordinate reference frame. The field conditions at the receiver may be near, intermediate or far. The second body, in accordance with a more limited embodiment of this invention, can also transmit similar signals receivable and processble at the first body such that either body knows its direction from and relative orientation with respect to the other body.

The transmitted signals, in accordance with the preferred embodiment of the invention, are directable, either physically or mathematically, although such directability is not critical to the broader aspects of the invention. The signals may be continuous or discrete, and, moreover, may include serial axial component transmission or composite axial component transmission.

In accordance with another aspect of the invention, the method and apparatus involves measurement of the distance between the first and second bodies and the use of the resultant vector to solve for various components of a vector triangle, the points of which corresponed to the first and second bodies and a remote body or object. This aspect of the invention enables, for example, a vector to the remote object known at the first body and defined in its coordinate reference frame to be transposed into the second body coordinate frame and made available for use by the second body.

DETAILED DESCRIPTION OF THE INVENTION

Introduction

Figure 1:
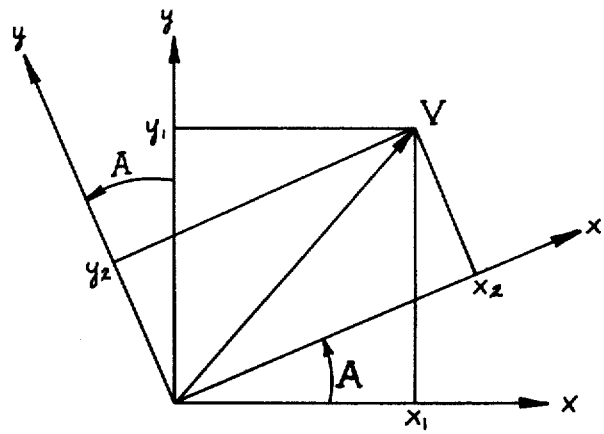
FIG. 1 describes the geometry of a simple coordinate transformation called a rotation.

This invention includes an object tracking and orientation determination means, system and process. The invention can provide in each of two independent body frames a measure of the pointing angles and range to the other body when a field transmitted from one body to the other body includes means for determining the direction to the source of radiation of the field. In accordance with one embodiment of this invention, a nutating field is the means by which the direction to the radiating source can be determined.

A field nutating about a pointing vector can additionally provide in each of two independent body frames a measure of the relative angular orientation of the other body frame. Although the invention can be used in a plurality of embodiments, only an embodiment for determining relative pointing angles, range and relative orientation between the two bodies and an embodiment for handing off information about a third body from a first to a second body will be described. However, it should be recognized that the invention is not limited to this embodiment and that it may be advantageous to determine the pointing angles, range and orientations of a plurality of objects with respect to one another. Further, it should be recognized that two-dimensional embodiments can be advantageously used where objects are restricted in motion to a single plane. In connection with such a two-dimensional embodiment, subsequent discussion of nutation includes two-dimensional nodding. Other embodiments can be used where only pointing angles of one object relative to another object are desired.

To determine pointing angles from the reference coordinate frame of a receiving object to a transmitting object, the transmitted field must have oscillating field components in directions perpendicular to the line connecting the transmitting and receiving bodies. For example, in a three-dimensional situation, the field can be rotating in a plane, nutating about a pointing vector or can utilize a discrete state representation. Orthogonal receiving means, such as coils 11, 12 and 13, shown in FIG. 4, at the receiving object detect spatial components of the transmitted field. A transformation performed on the detected components is used to establish a direction with zero magnitude when the field is rotating and with no modulation when the field is nutating. A tracking system including a transmitted field nutating about a pointing vector is described below and includes a discussion of the characteristics of a nutating field.

Radiating coils or dipoles need not necessarily be mutually orthogonal, but must be independently oriented. That is, a vector representing the orientation of one of the coils cannot be formed from a linear combination of two other vectors representing the orientation of the other two coils. In addition, two-axis sensing of three-axis excitation or three-axis sensing of two-axis excitation is possible. However, the orthogonal case of similar antennas will be described because it is simpler and easier to explain and implement.

Figure 2:
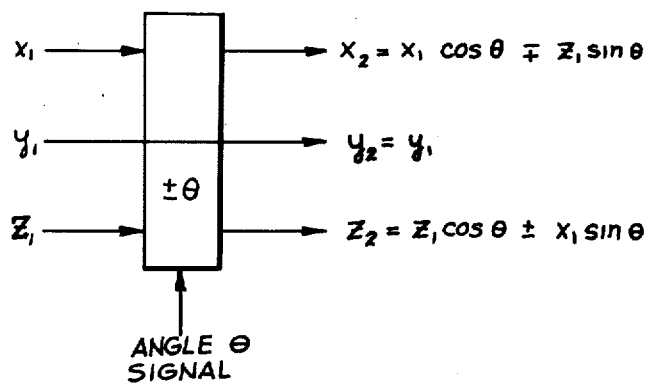
FIG. 2 is the block diagram representation of a single rotation operator called a resolver.

Therefore, apparatus in accordance with an embodiment of this invention for generating a directable, nutating, electromagnetic field along a pointing vector includes three orthogonally positioned coils or stub dipoles through which excitation currents can be passed. The mutually orthogonal coils at a transmitting body define a radiator reference coordinate frame. Mutually orthogonal coils at a receiving body define a sense reference coordinate frame. An orthogonal radiator pointing coordinate frame is defined as having an x-axis coincident withe pointing vector and a y-axis in the x-y plane of the reference frame and orthogonal to the x-axis of the pointing coordinate frame. The z-axis of the radiator pointing coordinate frame is mutually orthogonal to the above mentioned x and y axes, sensed according to the right-hand rule. With all pointing and orientation angles equal to zero, the radiator pointing frame, the radiator reference frame and the sense reference frame are all coincident in orientation. The nutating EM field can be described by a conical motion (continuous or intermittent) of the intensity or excitation vector about a direction called the pointing direction or axis of nutation of the composite nutating field, the conical apex being defined at the intersection of the radiator or excitor coils. Such a nutating field can be generated by a carrier signal modulated by either the combination of a DC signal in one of the coils, an AC signal in a second coil, and another AC signal having a phase in quadrature with the phase of the first AC signal passed through the third coil or by a discrete state signal as illustrated in FIG. 2, all three coils being mutually, spatially orthogonal. That is, as can readily be appreciated, the DC signal refers to an alternating current carrier having a constant modulation envelope and the AC signals refer to an alternating current carrier having a variable, for example, sinusoidal amplitude modulation envelope. The pointing vector is fixed to the composite direction of the axis of the resultant DC signal.

Figure 3:
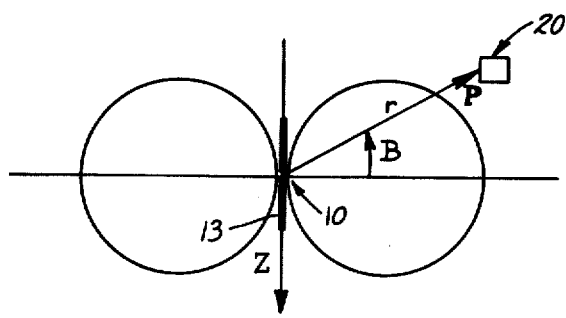
FIG. 3 is a schematic representation of an electromagnetic field from a single dipole along a plane containing the stub dipole.

Discussing the nature of a generated field, for simplicity, first consider the nature and intensity of a signal at a body 20 when sent from a body 10 having a single radiator 13 equivalent to simple dipole. Referring to FIG. 3, radiator 13 is a dipole aligned along the z-axis with the radiation center at the origin. Assume that vector P is pointing at body 20 and also assume that the distance to body 20 is at least about 5 wavelengths of the radiated field, so that plane wave conditions prevail. This means that essentially all the radiated energy lies in a plane normal to vector P as viewed by P. The intensity of the signal detected at body 20 is independent of an angle A (FIG. 4, z-axis only), the angle between the x-axis and the projection of vector P on the x-y plane, but is proportional to the cosine of the angle B, the elevation of vector P from the x-y plane. The signal processing strategy of the signal received at body 20 is based upon the properties of (1) plane wave and (2) intensity proportional to cos B. The relative signal strength in the direction of vector P is illustrated in FIG. 3. The intensity locus is r=Kcos B, where K is merely the proportionality constant representing the level of the excitation of the dipole antenna.

The carrier signal for the modulation can be either linearly polarized or circularly polarized. When the carrier is linearly polarized, the phase of the carrier applied to all of the radiators is the same. Thus, there is a resultant which is fixed in direction and changes in magntiude. Of course, the radiated field also changes in accordance with the modulation signal at a relatively slower rate. When the carrier is circularly polarized, the phase of the carrier signal is not the same on all radiators. Thus, there is a resultant which moves with respect to the radiators as a function of the carrier composite phase. In addition, as with linear polarization, the field also varies with the modulation on the carrier. Circular polarization is advantageous because it facilitates discrimination between the desirable direct line field signals and the undesirable reflected field signals. Further, circular polarization has additional information carrying capability which may be desirable in certain applications.

However, there are practical difficulties in using signals on three different coils of significantly varying magnitude. For example, the magnitude on each of the coils may vary from zero to the magnitude of the entire field. Such a great variation in applied signals presents problems in obtaining suitable electronic amplifiers which have a linear response over such a large range. The linear response is desired because a small signal should be amplified as much as the large signal. If this is not the case, the relative magnitudes of the output will not be the same as the relative magnitudes of the input, and what the receiver receives will not reflect the information supplied to the transmitter.

Further, it is typically required that each of the radiating means, i.e., each of the three antennas in a three-dimensional system, has its own associated amplifier. This adds the additional restriction that there must be three balanced linear amplifiers. That is, a given input magnitude on any of the axes, x, y or z, should produce the same output magnitude. Not only is this very difficult to achieve, but, once achieved, is very difficult to maintain. This invention recognizes that serial transmission of the axial field components permits use of a single transmitting amplifier which serially sends the signals representing the axial field components from all of the radiators.

This invention recognizes that the magnitude of the field components on each of the radiators can be encoded, thus permitting the actual magnitude radiated to be substantially constant. For example, encoding can make use of two sequential pulses, a first pulse going positive and a subsequent second pulse going negative whereby the spacing between the pulses indicates the magnitude of the first pulse. Another way of encoding a pulse stream is to let a zero phase represent a zero magnitude and let a 180° phase represent a one magnitude.

When the magnitude of the transmitted signal corresponds to the magnitude of the field component, the transmitted field physically has a changing configuration with respect to the radiators, e.g., the field rotates or nutates about the radiators. When the magnitude of the field component is encoded into the signal, and the magnitude of the signal is arbitrary, the physical configuration of the transmitted field depends upon the arbitrarily chosen signal magnitude. For example, if the arbitrarily chosen signal magnitude "one" remains constant, the radiated field will point in the same direction intermediate the x, y and z axes. As far as the receiver is concerned, though, the field is rotating or nutating in both situations, because the field provides the receiver with the same information in both cases. The terms directable field and pointing, thus, refer not only to a field which has been physically pointed, but also apply to a field which has had the field components encoded.

Coordinate Transformations

To make this rotating or nutating field directable, a signal processing means known as a coordinate transformation circuit must operate on the reference AC and DC excitation signals or the reference discrete state excitation signals in order to establish the magnitudes of the field on each of the axes to direct the normal to the plane of rotation in a rotating field or the pointing vector of a nutating field in the desired direction to point the nutating field in the desired direction. The generation of a nutating field is described in U.S. Pat. No. 4,017,858, issued on Apr. 12, 1977, to Jack Kuipers, entitled APPARATUS FOR GENERATING A NUTATING ELECTROMAGNETIC FIELD, the disclosure of which is incorporated by reference herein. A brief discussion of the coordinate transformation known as a rotation is presented as background in order to properly teach the principles underlying the techniques employed in this invention.

A vector transformed by pure rotation from one coordinate frame into another coordinate frame is also said to be resolved from the one into the other coordinate frame. Resolve and resolution in this context are synonyms for transform and transformation. The operator which transforms the components of a given vector in one coordinate frame into its components in another coordinate frame where the two coordinate frames are related by a simple angular rotation is defined as a resolver. The equations governing this transformation are:

$$x_2 = x_1 \cos A + y_1 \sin A$$

$$y_2 = y_1 \cos A - x_1 \sin A$$

$$z_2 = z_1$$

where in this case the z-axis is the axis of rotation. The equations are readily verified from the geometry illustrated in FIG. 1. Note that when the two components operated on by the resolver are ordered positively (zxyzxy ...), then the first component of the positively ordered pair always has the positive sine term when the angle of rotation is positive. If the angle of rotation is negative, then the sign of the sine term reverses. A convenient notation for a resolver is the block shown in FIG. 2 where the rotation in this case is shown as negative about the y-axis. The y component is therefore not affected by the transformation and this fact is indicated in this notation by passing that component directly through the box as shown, whereas, the resolver block representing FIG. 1 would show the z-axis passing directly through the box. This notation should be regarded as a signal flow or block diagram for vector components, particularly useful in describing the computational strategy employed in this invention.

Pointing Geometry

Figure 4:
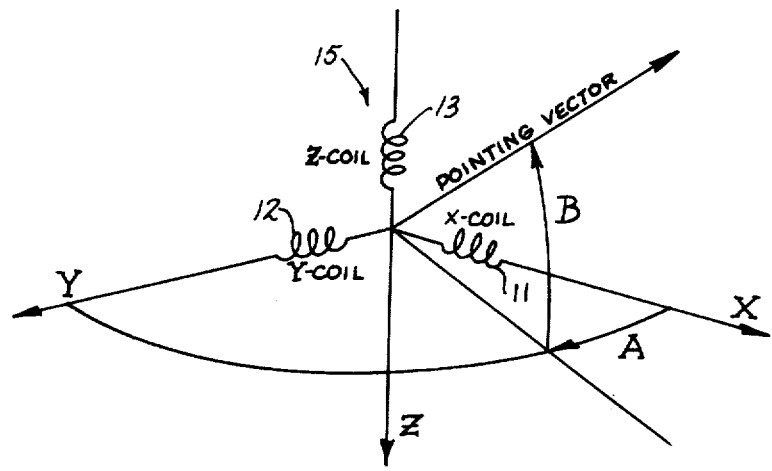
FIG. 4 shows the two pointing angles defined for three-dimensional pointing.
Figure 7:
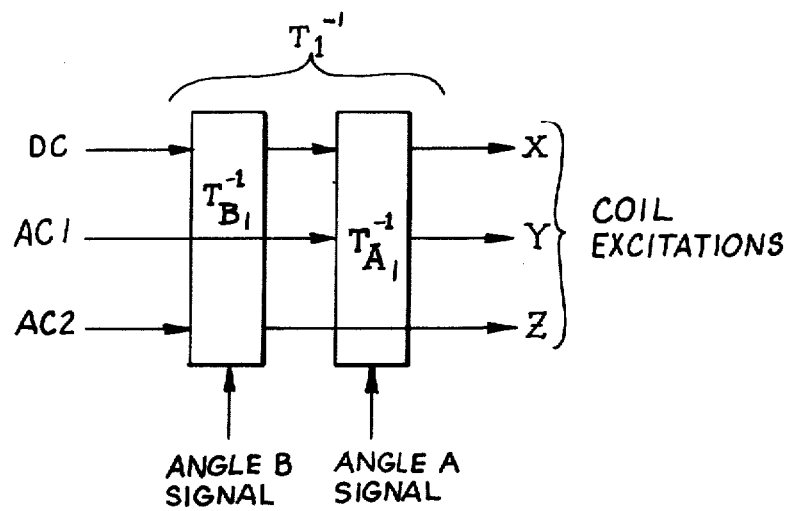
FIG. 7 is a block diagram of an excitation circuit for providing a pointing vector in accordance with FIG. 6 and FIG. 4.

A process in accordance with an embodiment of this invention includes the generation of a directable, nutating field, nutating about an axis called the pointing axis or the pointing vector. In one embodiment, the reference nutation excitation vector consists of three components: a DC and two AC signals quadrature related. In another embodiment, the reference nutation excitation vector consists of discrete state signals. The pointing vector and its entire nutating magnetic field structure are pointed in any desired direction defined in terms of angles A and B, in this case. FIGS. 4 and 7 illustrate the pointing geometry and the computational coordinate transformation circuitry necessary for achieving the desired pointing direction by operating on the given three reference excitation signals, whether the signal is continuous or discrete. A more detailed explanation of coordinate transformation, calculations and applications is contained in Kuipers, J., *Solution and Simulation of Certain Kinematics and Dynamics Problems Using Resolvers*, Proceedings of the Fifth Congress of the International Association for Analog Computation, Lausanne, Switzerland, Aug. 28–Sept. 2, 1967, pages 125-134, the disclosure of which is incorporated by reference herein.

Referring to FIG. 4 for a discussion of a pointing vector capable of pointing in any direction, an antenna triad 15 of body 10 shows three coils which are the equivalent of three dipole-stub antennas 11, 12 and 13 orthogonally arranged along x, y and z-axes, respectively. Let the radiation centers of coils 11, 12 and 13 be coincident at the origin. This x, y and z-axes frame for antenna triad 15 is fixed to body 10 and will be regarded as the reference frame. The body frame of body 10 to which antenna triad 15 is fixed differs from the reference frame by at most a constant matrix.

Figure 5:
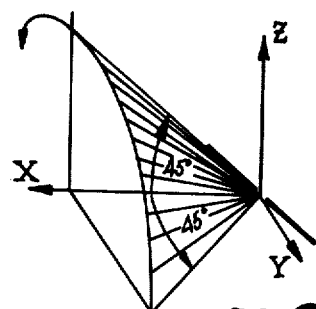
FIG. 5 is a representation of the nutating movement of an intensity or excitation vector of an electromagnetic field about a pointing vector in accordance with an embodiment of this invention.

The excitation vector of a signal applied to a single coil 13, such as illustrated in FIG. 3, is f=col (0, 0, K), where the x and y components are zeroes because there is only a z-axis antenna and K is the excitation level or intensity of reference excitation vector f. The notation "col" is used to indicate a single column matrix defining the three components of a vector. Accordingly, the excitation vector for antenna triad 15 is:

$$f = col(n, \cos mt, \sin mt) \qquad (1)$$

where n is greater than or equal to zero and where m is the radian frequency of the modulation of the carrier. When n is greater than zero, this excitation on antenna triad 15 results in what is equivalent to a nutating dipole. For example, as shown in FIG. 5, when n is equal to one, this nutating dipole can be visualized as being equivalent to an actual physical dipole oriented such that it makes a fixed angle of 45° with respect to the x-axis and nutates about this x-axis with a nutation rate equal to the sinusoidal or other modulation frequency indicated in the components of the excitation vector. When n is equal to zero, the excitation vector f rotates about antenna triad 15 in the plane excited by the y and z antenna components. As a result, an embodiment of this invention need not necessarily include nutation in a true sense. Nevertheless, when nutation is used, more information is available than when rotation is used. When n is equal to zero, there is no measure of transmitted pointing angle error available at the receiver. For example, with nutation of the radiated field, it can be determined at the receiving body whether or not the radiator is pointing the radiated field at the receiver. As n in equation (1) gets larger in magnitude, the receiver is able to be more sensitive to pointing errors at the transmitter.

The radiation pattern associated with this nutation dipole, of course, also nutates in the fixed x, y, z coordinate frame. Because of this, the signal at every point off the x-axis in the pointing frame x, y, z space is modulated at the nutation frequency. The magnitude of the signal detected at any point on the x-axis of the pointing frame, defined by the pointing vector, is invariant over the nutation cycle. This fact forms the basis for a signal processing strategy of a nutating field in accordance with an embodiment of this invention. Moreover, this unique direction of magnitude invariance with respect to the nutating electromagnetic field structure defines the direction of the pointing vector in this tracking system. The discussion follows for n equal to one.

Alternate Signal Formats

In accordance with an embodiment of this invention, the excitation vector as defined in equation (1) need not be continuous over the nutation cycle. That is, it may be convenient to employ a discrete state representation. For example, the nutation cycle can be defined in terms of the four states:

|        | x | y  | z  |
|--------|---|----|----|
| $f(t_1)$ | 1 | 1  | 0  |
| $f(t_2)$ | 1 | 0  | 1  |
| $f(t_3)$ | 1 | -1 | 0  |
| $f(t_4)$ | 1 | 0  | -1 |

(2)

where the vector f at the four discrete times, $t_1$ to $t_4$, has x, y and z values as indicated. The order and duration of each of these states can be modified or coded to contain meaningful system information, such as direction of nutation, reference axis, an angle measure, etc. A simple example is encoding one pointing angle on the relative durations of the first and second states of the four state sequence and encoding the other pointing angle on the relative durations of the third and fourth states. Such coding will be subsequently discussed in more detail. When the excitation vector uses discrete states between two bodies free to move in three dimensions, it is necessary that the transmissions from the radiator provide the sensor with as many independent, measurable quantities as the number of unknowns to be determined. When determination of relative roll is desired, the coding of the vector f includes identification of one of the states of the nutating or rotating field so a reference state can be established, at which time it can be determined at the receiver in what direction the radiated field is pointing relative to the radiator reference frame. For example, if there are four states in one nutation cycle transmitted in a known sequence, a reference state can be identified by having a longer time gap between each sequence of the four states than between the individual states in a sequence. If the nutating field is continuous, instead of discrete, a phase shift can be used to establish a reference state.

When both bodies have transmitting means so each receives information from the other, the bodies can alternate sending discrete states or they could be duplexed to send and receive simultaneously. For example, a first body can send a first state, a second body can send a first state and the first body can send a second state. Alternatively, the states can be sent as groups of twos or threes. Considerations for choosing among these possibilities include providing for storing information at the receiving body and the desired frequency of updating relative orientation and pointing angles.

In the embodiment where there are three dimensions, three transmitting antennas and three receiving antennas, a single amplifier can be used by successively sending each of the encoded amplitudes of the signals on each of the axes. Typically, in order to transmit the x, y and z components of a field signal or information state, three separate amplifiers are required. To be able to use a single amplifier at the transmitter, serial transmission can be used. That is, for each informational state, there would be the serial transmission of the coordinate components x, y and z. Thus, the amplifier would transmit the x component from the x antenna, then the y component from the y antenna, and the z component from the z antenna. Note that this sequential transmission of x, y and z in one informational state of one rotational cycle causes the physical transmitted field to make one complete physical rotation about the central axis of the physical rotation. Note, however, that if this is done, three amplifiers are still required at the receiver, one for each of the antennas. It is possible to utilize a single amplifier at the receiver if the transmitter repeats such signal three times, so that, for example, the transmission of each state would be x, x, x, y, y, y, z, z and z. As a result, the receiver amplifier can be selectively connected to each of the three receiving antennas and determine the value of the x component on each of the three receiving antennas. If there are four states, then there would be typically 36 separate transmissions, plus whatever transmissions or pulses might be used for initializing and synchronization, depending upon the application.

Even with the use of 36 pulses as described above, the transmitter amplifier may be required to amplify signals having a wide range in magnitude. This places a stringent requirement on linearity which is often difficult to meet. As a result, in accordance with an embodiment of this invention, the magnitude of each of the field components is encoded onto the signal so that the actual transmitted magnitude is substantially constant and the magnitude of the field component is represented by some other means. For example, as mentioned earilier, these means can include sending sequential positive going and negative going pulses for each of the items of information to be transmitted. The actual magnitude desired can be encoded by the analog pulse separation time. This pulse separation can be detected at the receiver and used to properly weight the preceding pulse.

Such a scheme would require 36 positive pulses and 36 negative going pulses. Alternatively, the three identical transmissions of each component could be spaced to encode their weight. Further, as another alternative, in a pulse string, the zero phase can represent a zero magnitude, a 180° phase can represent a one magnitude, and intermediate phase can represent intermediate magnitudes. Clearly, there are other alternatives within the skill of the art for encoding information.

| INFORMATIONAL STATES & TRANSMISSIONS IN EACH STATE | | | | |
|---|---|---|---|---|
| 1 | 2 | 3 | 4 | |
| x | x | x | x | (3) |
| x | x | x | x | |
| x | x | x | x | |
| y | y | y | y | |
| y | y | y | y | |
| y | y | y | y | |
| z | z | z | z | |
| z | z | z | z | |
| z | z | z | z | |

Note, however, that the particular order of the x, y and z components in each of the informational states can be varied. Changing the order of transmission of the x, y and z components, in turn changes the switching order of the amplifier in the transmitter and the switching order of the amplifier in the receiver. Further, transmission of only two states can be used to define a plane of rotation in a rotational cycle. That is, if the two states are used to define the y and z axes, the x-axis can be defined by taking the cross product of the y and z axes. When nutation is used, the receiver has the capability of determining whether or not the transmitter is pointing at the receiver. Thus, additional information is available when three states are used to define a nutation, as opposed to a rotating, field. Additionally, the use of more than two states to specify a rotational cycle is advantageous for some troubleshooting.

When the magnitudes of the field components are encoded as discussed above, it is not necessary to additionally encode the pointing angles of the transmitted field with respect to the reference frame of the transmitter. That is, the receiver can compute the transmitter's relative orientation to the receiver from the matrix of information that it receives. More specifically, the physical movement of the field defined by, for example, a one on the x-axis, then a one on the y-axis and finally a one on the z-axis about a central axis of the physical field provides sufficient information to establish the relative orientation of the transmitter's axes relative to the receiver. However, computing the two pointing angles from this information places an additional burden on the computer at the receiving body. This disadvantage typically outweighs the advantage that computation of the pointing angles obviates some angle encoding apparatus in the transmitter. Therefore, as discussed elsewhere in this application, it is also possible to encode the transmitter's pointing angles in the transmitted field and then decode them at the receiver.

Two-Way Signal Processing and Algorithms

Figure 6:
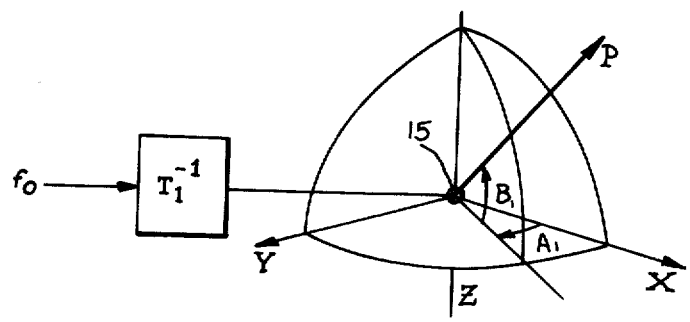
FIG. 6 is a block diagram of the path of a reference nutating electrical input signal to an antenna positioned at the origin of a coordinate frame and a schematic diagram of a generated pointing vector.

A nutating electromagnetic field with a pointing vector coincident with the x-axis of the radiator reference frame is the result of the excitation vector of equation (1) on antenna triad 15 and is shown in FIG. 5. However, in general, body 20 will not be on the radiator reference frame x-axis (see FIG. 8). Therefore, it is desirable to position or direct the pointing vector to be colinear with a line connecting bodies 10 and 20. This means that the tracking system must have the capability of pointing the nutation axis of the nutating electromagnetic field arbitrarily over a sphere surrounding body 10. This is accomplished by an orthogonal coordinate transformation $T_1^{-1}$, shown in FIG. 6. It consists of two rotations $T_{B1}^{-1}$, and $T_{A1}^{-1}$, operating on the nutation input excitation reference vector $f_o$. The letter T represents a transformation and the letters A and B represent angles. The subscripts to the letters T, A and B identify the body associated with the particular transformation or pointing angle. The use of capital letters as subscripts denotes measured or estimated values, whereas the use of lower case letters for subscripts denoted actual spatial relationships between body 10 and body 20. As shown in FIG. 7, $T_{A1}^{-1}$ and $T_{B1}^{-1}$ are the transformations through angles A and B, respectively. Transformation $T_1^{-1}$ is the combination of transformations $T_{A1}^{-1}$ and relates the reference input excitation vector $f_0$ to the actual excitations required on the radiator elements to give the desired pointing vector. The coordinate transformations corresponding to the two rotations relating the input vector to the vector P are defined as follows:

$$T_{A1} = \begin{bmatrix} \cos A_1 & \sin A_1 & 0 \\ -\sin A_1 & \cos A_1 & 0 \\ 0 & 0 & 1 \end{bmatrix} \text{ and } T_{B1} = \begin{bmatrix} \cos B_1 & 0 & -\sin B_1 \\ 0 & 1 & 0 \\ \sin B_1 & 0 & \cos B_1 \end{bmatrix} \quad (4)$$

The output of this operation gives the correct composite DC and AC modulated carrier excitation to each of the elements in the antenna triad such that the pointing vector P is directed in accordance with two specified angles $A_1$ and $B_1$, as shown. Thus, with pointing angles $A = B = 0$ as shown in FIG. 5, the resultant electromagnetic field nutates about the reference x-axis, while in FIG. 6, the identical electromagnetic field structure nutates about a pointing vector P, directed in accordance with pointing angles $A_1$ and $B_1$.

The relative orientation of body 20 with respect to the body frame (radiator reference frame) of body 10 is defined by the transformation O:

$$O = \begin{bmatrix} 1 & 0 & 0 \\ 0 & \cos\phi & \sin\phi \\ 0 & -\sin\phi & \cos\phi \end{bmatrix} \begin{bmatrix} \cos\theta & 0 & -\sin\theta \\ 0 & 1 & 0 \\ \sin\theta & 0 & \cos\theta \end{bmatrix} \begin{bmatrix} \cos\psi & \sin\psi & 0 \\ -\sin\psi & \cos\psi & 0 \\ 0 & 0 & 1 \end{bmatrix} \quad (5)$$

Figure 8:
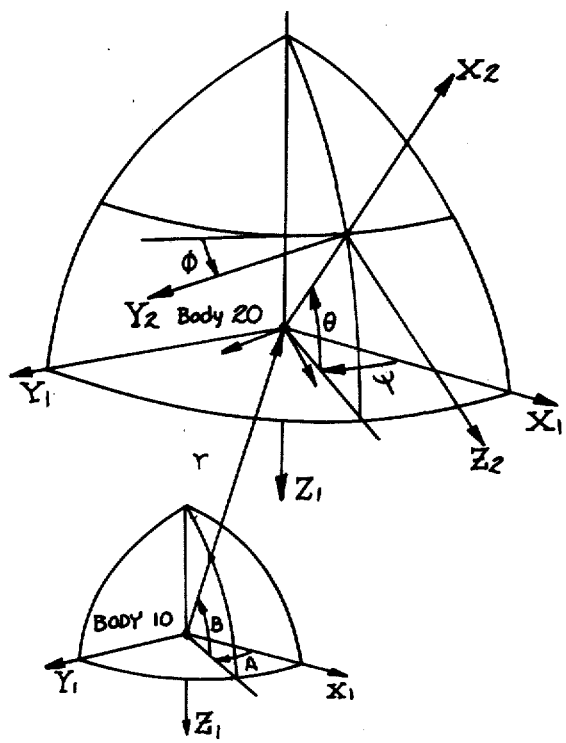
FIG. 8 is a schematic diagram of the relative coordinates of a first body and a second body and a sequence of rotation relating the two coordinate frames.

That is, the orientation of body 20 can be related to the frame of body 10 by a sequence of three rotations as illustrated in FIG. 8. The sequence of a rotation about $z_1$ through an angle $\psi$ followed by a rotation about the new y axis through an angle $\theta$, and finally a rotation about the new x-axis through an angle $\phi$, establishes the orientation of the $x_2y_2z_2$ frame of body 20 with respect to the $x_1y_1z_1$ frame of body 10. The independent pointing geometry is shown in the lower portion of FIG. 8. It should be noted that the axes identified as $x_2y_2z_2$ in FIG. 8 are translated from the origin at body 20 merely to avoid diagrammatic congestion in an attempt to clearly illustrate the Euler angles $\psi$, $\theta$ and $\phi$ involved in the relative orientation geometry.

Figure 9:
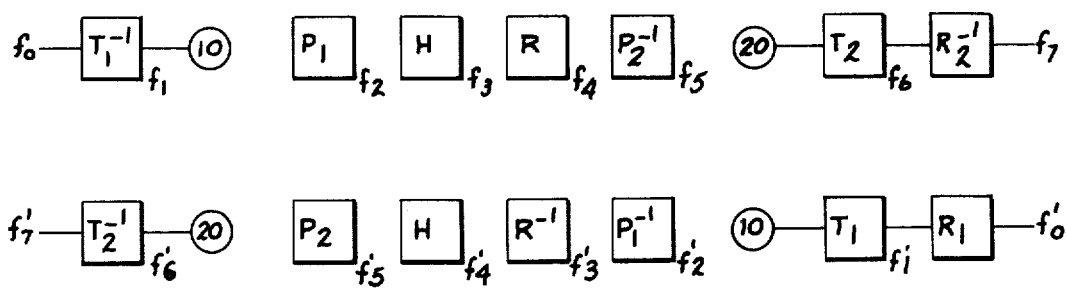
FIG. 9 is a block diagram of a pair of antennas acting as both transmitting means and receiving means and associated coordinate transformations in accordance with an embodiment of this invention.

A summary of the coordinate frame relationships involved in a tracking system in accordance with an embodiment of this invention is illustrated in FIG. 9. The upper block diagram shows the reference nutating excitation vector $f_0$ defined in the frame of body 10. Operating in this excitation vector with the pointing transformation $T_1^{-1}$ produces the proper excitations, defined by vector $F_1$, for antenna triad 15 of body 10 such that the nutating signal is continuously pointed at body 20.

The effects of body 10 position and roll (or orientation) can be included in the body 10 to body 20 system equations through the application of three additional sets of linear transformations and one field coupling matrix, as shown in FIG. 9. Whereas pointing transformations $T_1^{-1}$ and $T_2$ and roll transformation $R_2^{-1}$ are determined through measured or estimated values, the body 10 to body 20 coupling transformations $P_1$, H, R and $P_2^{-1}$ are representative of the actual spatial relationship of body 10 to body 20. Since body 20 is not, in general, located on the x-axis of body 10, rotation matrices must be applied to determine the fields produced at its location.

The actual excitation vector $f_1$ of body 10 is defined in the body 10 coordinate frame, denoted by the subscript "1". This excitation is conveniently transformed into an equivalent source excitation vector $f_2$, which is referenced to the pointing coordinate frame. This is accomplished by the position transformation $P_1$, which is indicative of the actual spatial relationship between body 10 and body 20, where:

$$f_2 = P_1 f_1 = P_{b1} P_{a1} f_1 \text{ and} \quad (6)$$

$$P_{a1} = \begin{bmatrix} \cos a_1 & \sin a_1 & 0 \\ -\sin a_1 & \cos a_1 & 0 \\ 0 & 0 & 1 \end{bmatrix} \quad (7)$$

$$P_{b1} = \begin{bmatrix} \cos b_1 & 0 & -\sin b_1 \\ 0 & 1 & 0 \\ \sin b_1 & 0 & \cos b_1 \end{bmatrix} \quad (8)$$

The vector $f_2$ may be regarded as the excitation of an equivalent radiator whose axes are aligned with the axes of the true pointing coordinate frame.

Since vector-matrix notation is used to describe the theory and operation of the two-way system and algorithms, it is useful to convert the coordinate components of the electromagnetic fields into a matrix function H(r) relating the body 10 equivalent excitation vector components of $f_2$ to the resultant field components at the body 20 location and ultimately to the body 20 output vector $f_5$, where r is the distance between body 10 and body 20. For a similarly oriented body 10 and body 20, i.e., when the axes of body 20 are aligned with those of body 10, the field coupling matrix H(r) for near-field and the far-field can be shown to be the following (normalized):

$$H_{nf} = \frac{1}{r} 3 \begin{bmatrix} 1 & 0 & 0 \\ 0 & -\frac{1}{2} & 0 \\ 0 & 0 & -\frac{1}{2} \end{bmatrix} \quad (9)$$

$$H_{FF} = \frac{1}{r} \begin{bmatrix} 0 & 0 & 0 \\ 0 & 1 & 0 \\ 0 & 0 & 1 \end{bmatrix} \quad (10)$$

A similar matrix exists for the intermediate-field condition. By using the appropriate field coupling matrix in FIG. 9, the two-way system as disclosed can be made operational at any distance, whether near-, intermediate- or far-field.

Now consider the output $f_3$ of the equivalent body 20 frame whose axes are aligned with the body 10 pointing coordinate frame, that is, whose orientation is identical to that of the equivalent body 10 axes at $f_2$. The transformation $c/_r nH(r)$ relates the field sensed at body 20 to the field generated at body 10 by using the aforementioned field coupling equations. Therefore, $$f_3 = C(r) H(r) f_2 \quad (11)$$

where n=1 for far-field operation and n=3 for near-field operation. The scalar factor C(r) collects quantities such as number of turns in the source windings, sensor sensitivity, propagation constants, distance and amplifier gain, as well as any desired scale factors that are common to all axes.

H(r) is called the field coupling matrix. This field coupling matrix H(r) differs depending upon whether near-, intermediate- or far-field conditions apply, as discussed above.

The output $f_3$ of an equivalent body 20 signal is now transformed to the body 20 zero-roll pointing coordinate frame by the aforementioned roll transformation, thus:

$$f_4 = R f_3 \quad (12)$$

where R is the following matrix:

$$R = \begin{bmatrix} 1 & 0 & 0 \\ 0 & \cos\phi & \sin\phi \\ 0 & -\sin\phi & \cos\phi \end{bmatrix}$$

The transformation R relates the pointing frames of body 10 and body 20 by a relative roll angle about their common pointing axis. The vector $f_4$ is equivalent to the output of an equivalent sensor fixed in the body 20 pointing coordinate frame. This equivalent sensor output $f_4$ is next converted to the true body 20 sensor output vector $f_5$, i.e., the output of the sensor in body 20 by the inverse position transformation $P_2^{-1}$, hence:

$$f_5 = P_2^{-1} f_4 = (P_{b2} P_{a2})^{-1} f_4 = P_{a2}^{-1} P_{b2}^{-1} f_4 \quad (13)$$

The two position transformations, the one relative roll transformation and the field coupling transformation can now be combined to produce an overall body 10 to body 20 coupling equation:

$$f_5 = P_2^{-1} R\ C(r)\ H\ P_1 f_1 = T f_1 \text{ where} \quad (14)$$

$$T = C(r)\ P_2^{-1}\ R\ H\ P_1 \quad (15)$$

and where H and C(r) are appropriate to the selected mode of operation. This sequence of transformations represent the actual spatial relationship between body 10 and body 20 in FIG. 9, both geometrically and electromagnetically.

In body 20, a receiving antenna traid 25 detects the nutating field components. By processing the signal to determine a direction having no modulation signal component, the direction of the "normal" to the received plane-wave is determined. This direction is defined by two computed angles, as in FIG. 6, and establishes the pointing transformation $T_2$. Actually, $T_2$ is that transformation that produces the plane-wave vector equivalent $f_6$ of the transmitted vector $f_0$. That is, when there is no pointing error and ideal free space transmission is assumed, the normalized tangential components of $f_0$ are equal to the normalized tangential components of $f_6$. The radial component of the transmitted vector $f_0$ is lost because of the assumed far-field condition and the received vector $f_6$ then, after being properly transformed and processed, also has a zero radial component. Whether near-field, intermediate-field or far-field signals are received, the signal processing strategy is or may be the same. That is, either the radial component is non-zero as in the near-field, intermediate-field or zero as in far-field. The processing which determines the pointing angles is that no modulation or nutation components exist in the radial direction, in all three cases, whether the signal is continuous or discrete. When the receiver body is pointing at the transmitting body, confirmation that the transmitting body's pointing angles to the receiver body are correct is provided by modulation components of the nutating field at the receiver body being a vector of constant magnitude and rotating in the plane normal to the pointing vector from the receiver body to the transmitter body, thus describing a circular pattern. Deviation of the modulation components from such a circular pattern can be used as an alternative control law for a tracking system.

The upper block diagram in FIG. 9 represents coordinate frame relationships when operating or transmitting from body 10 and received in body 20. Similarly, the lower block diagram represents coordinate frame relationships when operating or transmitting from body 20 and received in body 10. The two block diagrams are, in a sense, inverses of one another and indicate the transponding nature of this tracking system. These coordinate frame relationships form the basis for the signal processing strategy of this tracking system.

If the matrix product of the transformations between the excitation vector $f_0$ and the reconstructed or reprocessed vector $f_7$ were the identity matrix, then clearly, $f_7 = f_0$. The situation is not this simple, primarily because of nonlinear attenuation characteristics of the vector components of electromagnetic radiation. These attenuation characteristics are a function of wavelength and distance and are represented by the field coupling matrices H(r). The explanation of the system concepts is, however, simplified by the plane-wave assumption, even though not valid for all circumstances. With the assumption that plane-wave conditions prevail, that is, the radial component of the received signal is zero, the plane containing the radiated energy is normal to the line connecting body 10 and body 20, as viewed at the receiving body. This is so even if large errors are present in the pointing.

An error in the pointing angles of the pointing vector originating at the transmitter is indicated when the magnitude of the received signal component sensed in the pointing direction is not invariant over the nutation cycle, whether the signal is continuous or discrete. The frequency of this variation due to the pointing error is equal to the nutation frequency. The magnitude of the variation is proportional to the magnitude of the pointing error, and the phase of this periodic error function resolves into two components which are related to the errors in the two pointing angles A and B.

Phase discrimination circuitry, similar to that commonly used in flight control applications, can provide a continuous measure of the angular errors in the two pointing angles. However, the phase measure of the error requires a cyclic reference against which the measure of the phase is to be compared. Therefore, there is advantageously provided a continuous identification of either a positive going zero-crossing when a continuous nutation vector is used to generate the nutating field or of an extended duration of the reference state when a discrete state excitation vector is used to generate the nutating field. The resulting measure of angular error is used for correcting the angles in the pointing transformation, such that the pointing errors tend toward zero. As a result of knowing the sequence of nutation states (either continuously or discretely) about the pointing vector, the relative angular displacement (or roll) about the pointing vector of the receiving body with respect to the transmitting body can be determined. The transformation R referes to such a roll angle relationship between body 10 and body 20 about the pointing axis.

Both of the excitation vectors, $f_0$ and $f_7'$, and both of the output vectors, $f_7$ and $f_0'$, are defined in their respective pointing frames and normalized. The pointing frame x-axis is directed such that it contains body 10 and body 20. As noted above, the y-axis is orthogonal to the x-axis and lies in the reference frame x-y plane; the z-axis is mutually orthogonal (in the right-handed sense) to the pointing frame x and y axes.

In summary, the steady-state vectors defined in the upper block diagram of FIG. 9 are:

$f_0$ points from body 10 to body 20; its components are defined in the pointing frame by equation (1).

$T_1^{-1} f_0$ is the same vector with components defined in the reference frame of body 10 for exciting antenna triad of body 10.

$TT_1^{-1} f_0$ is again the same vector whose components are ideally detected in and therefore defined in the reference frame of body 20, where T is the spatial transformation (including the field coupling matrix H[r]) between bodies 10 and 20.

$R_2^{-1} T_2 T T_1^{-1} f_0$ is the same vector whose components are reproduced in the pointing frame by choosing, after computation, the appropriate pointing transformation $T_2$ relative to the frame of body 20. The transformation $R_2^{-1}$ is required to correct for the relative roll angle about the pointing vector and is generated by satisfying the control law that the field components of vectors $f_0$ and $f_7$ orthogonal to the pointing vector are equal, except for an attenuation constant, or that the sequence of transformation between $f_0$ and $f_7$ must be equivalent to the identity, a constant.

The output vector $f_7$ for a steady-state, far-field condition will have all zeroes for its x components. For example, if the input vector $f_0$, over one nutation cycle, is represented by $$f_0 = \begin{bmatrix} 1 & 1 & 1 & 1 \\ 1 & 0 & -1 & 0 \\ 0 & 1 & 0 & 1 \end{bmatrix} \tag{16}$$

then the output vector $f_7$ is, over one nutation cycle, $$f_7 = \begin{bmatrix} 0 & 0 & 0 & 0 \\ 1 & 0 & 1 & 0 \\ 0 & 1 & 0 & 1 \end{bmatrix} \quad (17)$$

However, if the tracking system is not operating so the field has far-field characteristics at the receiver, the x-components (i.e., the first row of $f_7$) will be non-zero, constant and equal in each state. The product of the roll transformation $R_2^{-1}$ at body 20, and the roll transformation $R_1^{-1}$ at body 10 is equal to the identity matrix because each body has the same roll with respect to the other body except to sign. More specifically, $$R_2 \cdot R_1^{-1} = \begin{bmatrix} 1 & 0 & 0 \\ 0 & \cos\rho & \sin\rho \\ 0 & \sin\rho & \cos\rho \end{bmatrix} \quad (18)$$

Referring again to FIG. 9, the indicated operations on the excitation vectors in the two block diagrams which illustrate the transponding scheme can be written:

$$f_7 = R_2^{-1} T_2 P_2^{-1} R H P_1 T_1^{-1} f_0 \quad (19)$$

$$f_0^{-1} = R_1 T_1 P_1^{-1} H P_2 T_2^{-1} f_7^{-1} \quad (20)$$

To compute the errors in pointing angles A and B and the roll angle $\rho$, the input and output vectors are processed using the overall two-way system function developed from the upper block diagram in FIG. 9, i.e., equation (19), where $$W = R_2^{-1} T_2 P_2^{-1} R H P_1 T_1^{-1} \quad (21)$$

will be used for short-hand notation. The signal processing of the two-way system is based upon the equation $$f_7 = W f_0 \quad (22)$$

where $f_0$ is the set of excitation vectors employed to excite the radiator of body 10 (defined in the pointing frame of the radiator) and $f_7$ is the set of corresponding signals received by the remote body 20 sensor.

The nutating set of vectors $f_0$ suitable for determining the angles comprising W can be represented in various ways. Two of these sets are illustrated in equations (1) and (16). Returning to FIG. 9, $f_0$ is a nutating set of excitation vectors which are defined to track the remote body in the steady state. Therefore, the transformation $T_1$ is the computed pointing transformation in body 10, whereas $P_1$ is the actual pointing transformation in body 10, that is, $P_1$ is that transformation necessary for body 10 to be truly pointing at body 20. Similarly, $T_2$ and $P_2$ are the computed and actual pointing transformations in body 20.

In the steady state, i.e., when no transient dynamic errors exist, and under ideal free space transmission conditions, (H[r] is the identity matrix).

$$P_1 T_1^{-1} = T_1 P_1^{-1} = \text{Identity} \quad (23)$$

$$P_2 T_2^{-1} = T_2 P_2^{-1} = \text{Identity} \quad (24)$$

$$RR_2^{-1} = R_2 R^{-1} = \text{Identity} \quad (25)$$

However, the tracking operation of the two-way system is based upon the system capability for measuring tracking and roll errors. Therefore, under dynamic conditions between the two independent bodies, $$T_1 / P_1 \quad (26)$$

and $$T_2 / P_2 \quad (27)$$

$$R / R_2 \quad (28)$$

In general, small tracking errors exist. These errors can be expressed as follows:

$$P_1 = P_{b1} P_{a1} \quad (29)$$

$$T_1 = P_{b1 - \Delta b1} P_{a1 - \Delta a1} \quad (30)$$

$$= P_{b1} P_{\Delta b1} P_{a1} P_{\Delta a1}$$

$$= P_{b1} P_{\Delta b1}^{-1} P_{\Delta a1}^{-1} P_{a1}$$

The actual pointing angles $a_1$ and $b_1$ can assume any pointing direction necessary. The following derivation of pointing angle errors will assume, however, that the computed pointing angles differ from the actual pointing angles by a small angle. Therefore, $$1 >> \Delta a, \Delta b \cong 0 \quad \text{radians}$$
and
$$\cos \Delta a \cong 01 \quad (31)$$
$$\sin \Delta a \cong \Delta a \quad (32)$$

Using these values in the matrices $P_a$ and $P_b$, which were defined above, one gets the following:

$$P_{\Delta a1} = \begin{bmatrix} 1 & \Delta a_1 & 0 \\ -\Delta a_1 & 1 & 0 \\ 0 & 0 & 1 \end{bmatrix} = I + E_{\Delta a1} \quad (33)$$

$$P_{\Delta b1} = \begin{bmatrix} 1 & 0 & -\Delta b_1 \\ 0 & 1 & 0 \\ \Delta b_1 & 0 & 1 \end{bmatrix} = I + E_{\Delta b1} \quad (34)$$

where I is the identity matrix, and E is an error matrix. Utilizing equations (18), (30), (33) and (34), it can be shown that $$P_1 T_1^{-1} = I + E_{\Delta b1} + P_1 E_{\Delta a1} P_1^{-1} \quad (35)$$

$$T_2 P_2^{-1} = I - E_{\Delta b2} - P_2 E_{\Delta a1} P_2^{-1} \quad (36)$$

$$R_2^{-1} R = (I + E_{\Delta R2}) \quad (37)$$

Substituting these transformations expressed in terms of angular errors into the system equation results in $$W = H(r) + (E_{\Delta r2} - R^{-1} E_{\Delta b2} R - R^{-1} P_2 E_{\Delta a2} P_2^{-1} R) H + H (E_{\Delta b1} + P_1 E_{\Delta a1} P_1^{-1}) \quad (38)$$

$$H(r) + (\text{body 20 pointing errors}) + (\text{body 10 pointing errors})$$

By choosing an appropriate field coupling matrix H(r) and an appropriate set of excitation vectors $f_0$, one can determine the body 20 pointing errors in the sensor pointing frame and the body 10 pointing errors. This signal processing can be used for nutating EM fields, whether far-field, intermediate-field or near-field, and whether the field is continuous or discrete. As noted before, additional information, namely, regarding the pointing errors of body 10 can be obtained in body 20 by processing in body 20 signals present in the plane perpendicular to the line between bodies 10 and 20.

It is clear that an analogous summary of vector definitions can be stated for the lower block diagram of FIG. 9 indicating the signal going from body 20 back to body 10. The signal flow from body 10 to body 20 and back to body 10 completes one transponding cycle. This cyclic transponding behavior continues so that under dynamic conditions, such as where two bodies are in relative motion, the pointing angles to the other body may be determined in each of the two bodies. Over one transponding cycle, with the requirements that the respective y and z components of vector $f_0$ and $f_7$ are equal, the computability of the desired pointing angles $A_2$ and $B_2$ and the relative roll angle $\rho_2$ in body 20 is assured. A similar discussion applies to the computation in body 10 of the pointing angles $A_1$ and $B_1$ to body 20 and also the relative roll $\rho_1$. Further, in accordance with an embodiment of this invention, the tracking system can be, for example, multiplexed or time-shared to include processing of the data related to n number of bodies such that the pointing angles to n-1 bodies can be determined in the $k^{th}$ body, for each of the n bodies. This can have application in formation control, multiple refueling of aircraft in flight and general use as an aircraft navigation and landing aid and aircraft collision avoidance.

In addition to all of the capabilities discussed above, a tracking system in accordance with an embodiment of this invention can have the capability of providing, in each body, a measure of the remote body relative orientation angles. The pointing angles and relative roll of each body are available in the body. Further, the orientation of one body with respect to the other body can be computed. However, to do this computation it is necessary to send from one body to the other body information defining the pointing angles of the pointing vector of the transmitting body, unless, as previously discussed, the magnitudes of the field components are encoded. Upon receipt of information defining the pointing angles of the transmitting body, the receiving body can compute the relative orientation between the transmitting body and the receiving body. Going from body 10 to body 20

$$R_2^{-1}T_2 = T_1O^{-1} \text{ or } O^{-1} = T_1^{-1}R_2^{-1}T_2 \qquad (39)$$

is computed at body 20 and going from body 20 to body 10

$$R_1^{-1}T_1 = T_2O \text{ or } O = T_2^{-1}R_1^{-1}T_1 \qquad (40)$$

is computed at body 10. Moreover, considering the symmetric nature of the transponding scheme between body 10 and body 20, it is clear that $$R_2^{-1}R_1 = (R_1^{-1}R_2)^{-1} = \text{Identity} = R_1^{-1}R_2 \qquad (41)$$

Tabulated below are four options involving permutations of variables such as the body whose orientation is desired, the body whose coordinate frame is used to express the orientation and the body where the orientation is computed or made available.

| Option | Orientation of Body | Made Available |
|---|---|---|
| I | 10 with respect to 20 | in 10 |
|  | 20 with respect to 10 | in 20 |
| II | 20 with respect to 10 | in 10 |
|  | 10 with respect to 20 | in 20 |
| III | 10 with respect to 20 | in 10 |
|  | 10 with respect to 20 | in 20 |
| IV | 10 with respect to 20 | in 10 |
|  | 20 with respect to 10 | in 10 |

Up to this point, the orientation of body frame 20 with respect to body frame 10 was defined by the transformation O (see equation [4]). A more precise notation is required in order to clearly define the orientation transformations tabulated above, in terms of the appropriate product of matrices available in the indicated body. Let the transformation $O_{ij}$ define the orientation of body frame i with respect to the body frame j. Then using equations (39), (40) and (41), the orientation transformations appearing in the four options tabulated above are:

$$O_{21} = T_2^{-1} R_2 T_1 \text{ computed in body 20} \qquad (42)$$
$$= T_2^{-1} R_1 T_1 \text{ computed in body 10} \qquad (43)$$
$$O_{12} = T_1^{-1} R_1 T_2 \text{ computed in body 10} \qquad (44)$$
$$= T_1^{-1} R_2^{-1} T_2 \text{ computed in body 20} \qquad (45)$$

Notice that the computations of the orientation transformations specified by equations (42) and (45) requires the pointing angles computed in body 10, and that in equations (43) and (44), the pointing angles computed in body 20 are required. This means that the pointing angles $A_1$ and $B_1$ defining the pointing transformation $T_1$, must be made available in body 20; and pointing angles $A_2$ and $B_2$, which define the pointing transformation $T_2$, must be made available in body 10. That is, these angles must be sent to the other body in order to compute the desired body orientation angles, in the body frame in which they are desired.

The transformation O defined in (4) relates the orientation of the (sense) reference frame of body 20 relative to the (radiator) reference frame of body 10. If it is desired to compute the orientation of body 20 relative to body 10 at body 20, computations at body 20 would use the algorithm specified in equation (42), namely, $$O = T_2^{-1}R_2T_1 \qquad (46)$$

The above transformation O can be determined at body 20 if the body 10 pointing angles defining transformation $T_1$ are sent from body 10 to body 20, since the angles defining the transformation $T^{-1}$ and $R_2$ can be determined at body 20. If, on the other hand, the orientation of body 10 relative to the reference frame of body 20 is desired at body 20, the algorithm specified in equation (45) is used at body 20. The computation of the set of Euler angles $\psi$, $\theta$, $\phi$ defining the relative orientation between the two bodies is well known and is shown, for example, by the connections within dotted lines 500 in FIG. 11. For a more complete discussion of these computations, see Kuipers' reference paper.

There are, of course, several schemes for getting a measure of the two angles, computed in one body, sent to the other body, such as, for example, using multiplexing techniques of the carrier. Advantageously, the components of the nutating signals already transmitted between the two remote bodies are coded. For example, the pointing angles $A_1$ and $B_1$ defining a pointing vector from body 10 can be sent to body 20 on separate states of the nutating excitation vector $f_0$. Similarly, pointing angles $A_2$ and $B_2$ defining a pointing vector from body 20 can be sent to body 10 on separate states of the vector $f_7{}^1$. The actual measure of the angles can be related to state-duration differences, for example, which could be determined by up/down counting on the carrier.

The angular error signals measured at the receiver are relative to and defined in the sense pointing frame. However, in order to determine a measure of the errors in the pointing angles and roll of the receiver body frame, it is desirable to have the measured errors in the sense pointing frame transformed into intermediate coordinate frames. This is because these directions in the particular intermediate frames, which constitute the Euler angle frame, are specifically appropriate for determining and making the required corrections in each of these three respective Euler angles (pointing angles and relative roll).

The orientation of the three orthogonal axes of the receiver body or sense reference frame can be specified with respect to the radiator pointing frame by an Euler angle-axis sequence. Consequently, in accordance with an embodiment of this invention, there is included an apparatus which can transform the sensed pointing angle and roll errors from the pointing frame of the radiated field into the corresponding angular corrections required by the respective Euler angle frame.

It can be appreciated that when the radiator pointing frame and the sense reference frame are coincident then the aforementioned transformation is not necessary. When this coincidence occurs, the pointing vector is along the x-axis of the radiator pointing frame and along the x-axis of the sense reference frame. In this case, errors sensed in the sense reference frame can be used directly to correct the receiving body pointing angles. It can therefore be appreciated that there can be some, say, small angle deviation from having the radiator pointing frame coincident with the sense reference frame and still use errors measured in the sense reference frame to correct the sense reference frame pointing angles directly. However, for example, in a situation where the x-axis of the radiator pointing frame is coincident with the z-axis of the sense reference frame, it is clear that an error about the x-axis of the receiver or sense pointing frame (defined further later) cannot be corrected by simply introducing an angular change about the x-axis of the sense reference frame. It can be appreciated that the correction should be made about the z-axis of the sense reference frame. A coordinate transformer apparatus 251 (FIG. 11) in accordance with an embodiment of this invention is introduced into the orientation and tracking system to make sure that proper corrections are made.

Two-Way System Description

Figure 11:
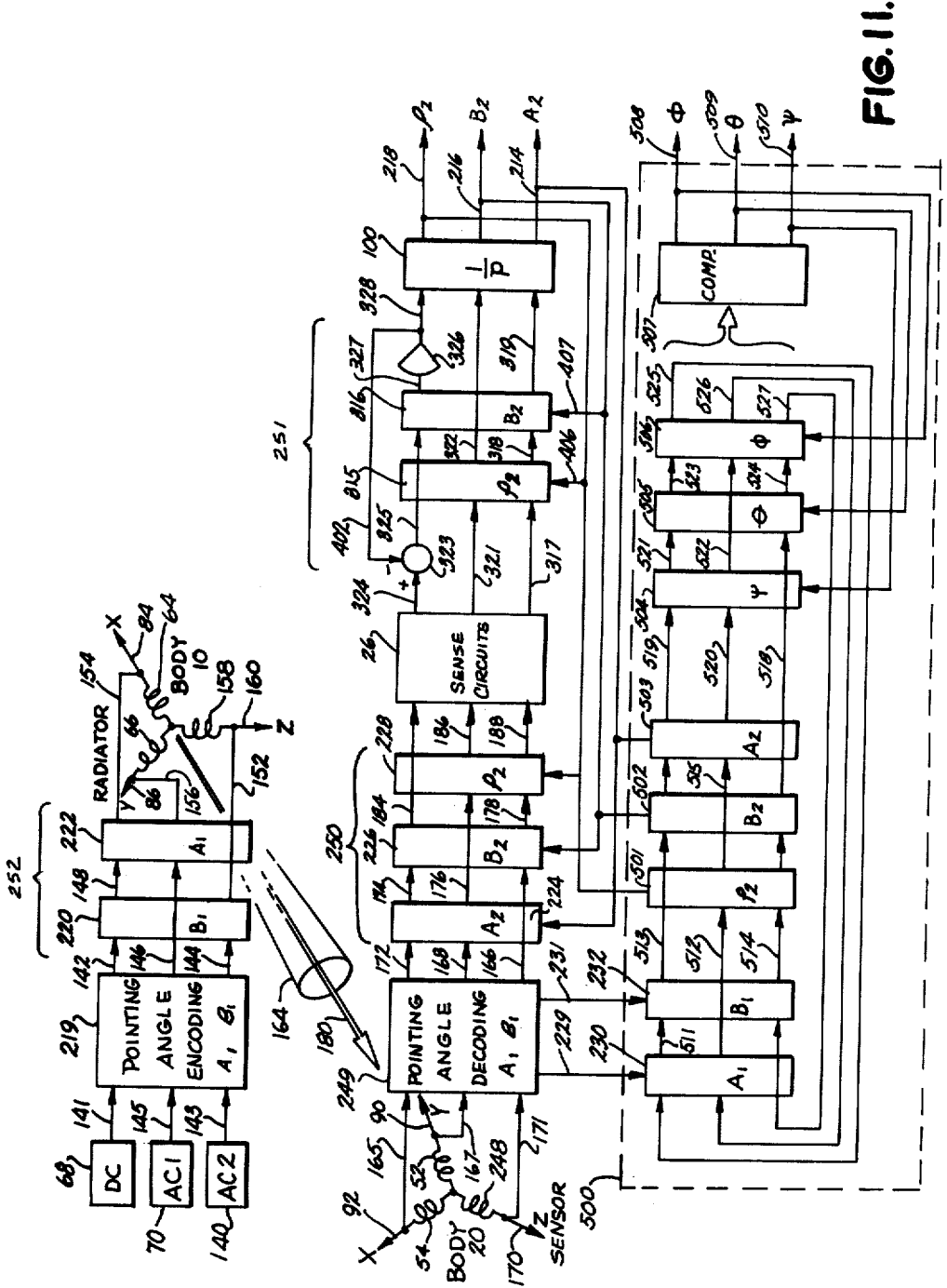
FIG. 11 is a schematic representation of a system in accordance with an embodiment of this invention which will compute the position or direction and the relative angular orientation of two bodies free to move in three dimensions.

FIG. 11 illustrates a tracking and orientation determined system using coordinate transformation means. The system includes in this instance mutually orthogonal magnetic field generating coils 158, 64 and 66 mutually orthogonal magnetic field sensing coils 428, 52 and 54. For ease of understandig, the three coils in each case have been shown as spatially separated. In actuality, the magnetic axes of both the generator coils and the sensor coils advantageously intersect in a mutually orthogonal relationship, and their centers in triad are advantageously coincident as shown by the cartesian coordinate frames 84, 86, 160, the radiator reference frame, and 90, 92, 170, the sense reference frame, respectively. Pointing frame excitation signals AC1 and AC2 are quadrature related or 90° phase related. They may be considered as sinusoids of equal amplitude but 90° out of phase, although the two signals AC1 and AC2 need not necessarily be sinusoidal in the practical embodiment of the system. Reference is again made of FIG. 4 which was related to the earlier discussion of coordinate transformation circuitry, and which shows the three-dimensional pointing geometry. The ability to point the pointing vector 180 in any direction in which the assembly of sensing coils 52, 54 and 248 are free to move enables the sensing coils to be tracked. The pointing excitation DC, AC1 and AC2 signals from sources 68, 70 and 140, respectively, define a conically nutating magnetic field 164 about a pointing axis 180 which is coincident with the axis of the DC component of the field. In one embodiment, the pointing excitation signals from sources 68, 70 and 140 are discrete state excitations as illustrated by equation (2). This discrete state signal is used to define a pointing axis in a manner similar to that of the continuous nutating signal. Rather than supply a continuous, conically nutating magnetic field about a pointing axis, though, a discrete state signal supplies points on the cone. This information is sufficient for the receiver to determine whether the radiator is pointing at the receiver. It should be emphasized again that the pointing of the vector 180 is accomplished electrically by the circuit to be described, while the physical generating coils 64, 66 and 158 maintain a fixed orientation physically.

Sources 68, 70 and 140 are connected by leads 141, 145 and 143 to a pointing angle encoder 219 for encoding the pointing angles of the radiated field with respect to the radiator reference frame. Encoder 219 is connected by leads 142 and 144 to resolver 220, whose output lead 148 and output lead 146 from encoding 219 are connected to a resolver 222. The output leads 154 and 156 provide reference frame excitation signals from resolver 222 to generator coils 64 and 66, respectively. Generator coil 158 is excited through connection 152 from the output of resolver 220. The two angles $A_1$ and $B_1$ of resolvers 222 and 220, respectively, are thus operating on the radiator pointing frame nutating field vector input whose components are the pointing frame excitations from sources 68, 70 and 140, so as to provide reference frame excitations to point the pointing vector 180 and its attendant nutating field structure in accordance with the geometry shown in FIG. 4.

The pointing vector 180 is presumed to be pointing nominally at the sensor which is fixed to the remote object to be tracked by the system. More specifically, a pointing vector from the radiator to the sensor defines the x-axis of a radiator pointing frame and a pointing vector from the sensor to the radiator defines the x-axis of a sense pointing frame. The sensor consists of the three mutually orthogonal sensor coils 52, 54 and 248, which are fixed to the remote object and in the preferred embodiment are aligned to the principal axes of the remote object, so that in the process of determining the orientation of the sensor triad, the orientation of the remote object is therefore determined. The signals induced in the sensor coils 52, 54 and 248 depend on the orientation of their sensor coordinate frame, defined by the mutually orthogonal coordinate axes 90, 92 and 170, relative to the pointing axis 180 and its two orthogonal nutation components of the nutating field. In other words, the particular mixing of the three excitation signals DC, AC1 and AC2 or of the discrete state components from sources 68, 70 and 140, induced in each of the three sensor coils 52, 54 and 248, depends not only upon the two pointing angles $A_1$ and $B_1$ relating the radiator frame to sense pointing frame, but also upon the three Euler angles, $\psi$, $\theta$, $\phi$ defining the relative angular orientation of the remote object (i.e., sense reference frame) relative to the radiator reference frame.

The principal function of the coordinate transformation circuit 250 in the overall computational strategy of the system is unmixing that part of the reference signal mix induced in the sensor coils attributable to the pointing angles, $A_2$ and $B_2$, and the roll angle $\rho_2$. If the three angles defining coordinate transformation circuit 250 properly represent the orientational relationship between the sensor coordinate frame and the sensor pointing frame, then the relative magnitudes of the signals sensed by the sense circuits 26 will correspond, except for an attenuation factor, to the unmixed pointing frame signals DC, AC1 and AC2, respectively, or the discrete state components, depending on signal format, from sources 68, 70 and 140, i.e., what is now termed the radiator pointing frame.

Sensor coils 52, 54, and 248 are connected to a pointing angle decoder 249 by leads 167, 165 and 171, respectively. Decoder 249 is used to determine the encoded pointing angles $A_1$ and $B_1$ of the radiated field whenever such information is encoded onto the field. Decoder 249 is connected to resolvers 230 and 232 by leads 229 and 231, respectively, and connected to resolver 224 by leads 168 and 172. An output 166 of decoder 249 and one output from resolver 224 connect to resolver 226 by leads 166 and 174, respectively. One output from resolver 224 and one output from resolver 226 connect to resolver 228 by leads 176 and 178, respectively. The two outputs from resolver 228 are connected to sense circuit 26 by leads 186 and 188, respectively. One output from resolver 226 connects to sense circuit 26 on leads 184. Outputs 172, 168 and 166 from decoder 249 carry the same information as leads 165, 167 and 171 because decoder 249 couples decoded information, if any, only to resolvers 230 and 232 by output leads 229 and 231, respectively.

Sense circuits 26 operate on the three input signals, provided by leads 184, 186 and 188, to sense deviations from their nominally correct values which should correspond to the radiator pointing frame excitation signal components 68, 70 and 140, respectively. The operation of sense circuits 26 is described in U.S. Pat. No. 3,868,565, issued on Feb. 25, 1975, to J. Kuipers, the disclosure of which is herein incorporated by reference. In the ensuing discussion, it will be assumed that body 20 is receiving a signal from body 10 and is processing the signal as discussed with respect to FIG. 11. The following is equally applicable, however, when body 10 is receiving a signal from body 20. Basically, sense circuits 26 compare an input vector in the radiator pointing frame derived from sources 68, 70 and 140 and represented by AC1 940 and AC2 942 with an output vector in the sense pointing frame from inputs 184, 186 and 188.

Figure 19:
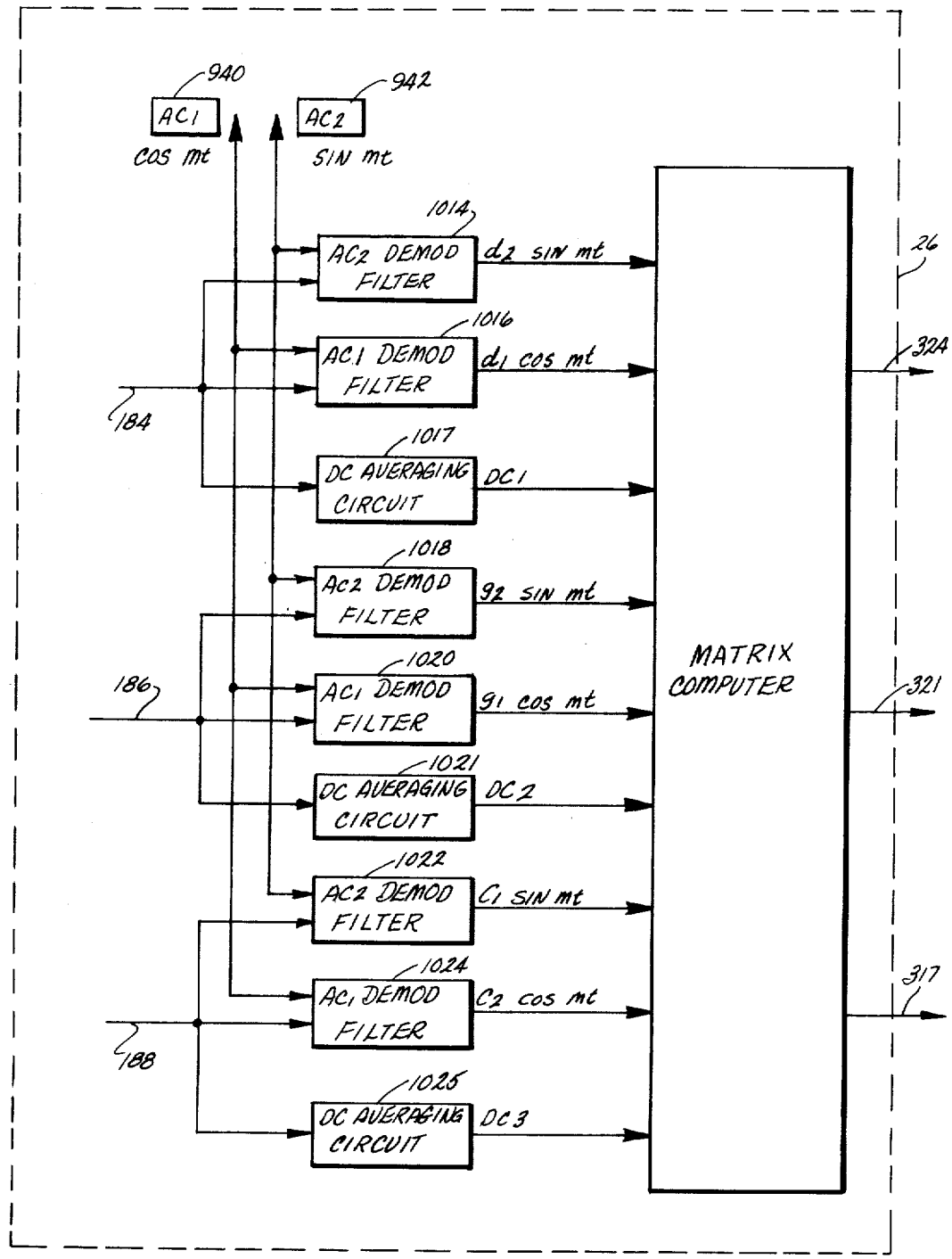
FIG. 19 is a schematic representation of the sense circuits 26 contained in FIG. 11.

In particular, and with reference to FIGS. 11 and 19, if the derotations performed by resolvers 250 correspond to the proper relationship of body 20 with respect to body 10, then the signals on lines 184, 186 and 188 would correspond precisely with the radiator input vector with components 68, 70 and 140, attenuation excepted. In general, however, there is some vector difference between the signals on lines 184, 186 and 188 and the input signals on lines 141, 145, 143 and the comparison performed by sense circuits 26 will indicate this as error vectors defined in the body 20 pointing frame. This error vector indicates that one or more errors exist in the orientation of the radiator pointing frame, the assumed orientation of the sensor pointing frame or the relative roll angle between these two pointing frames.

Figure 18:
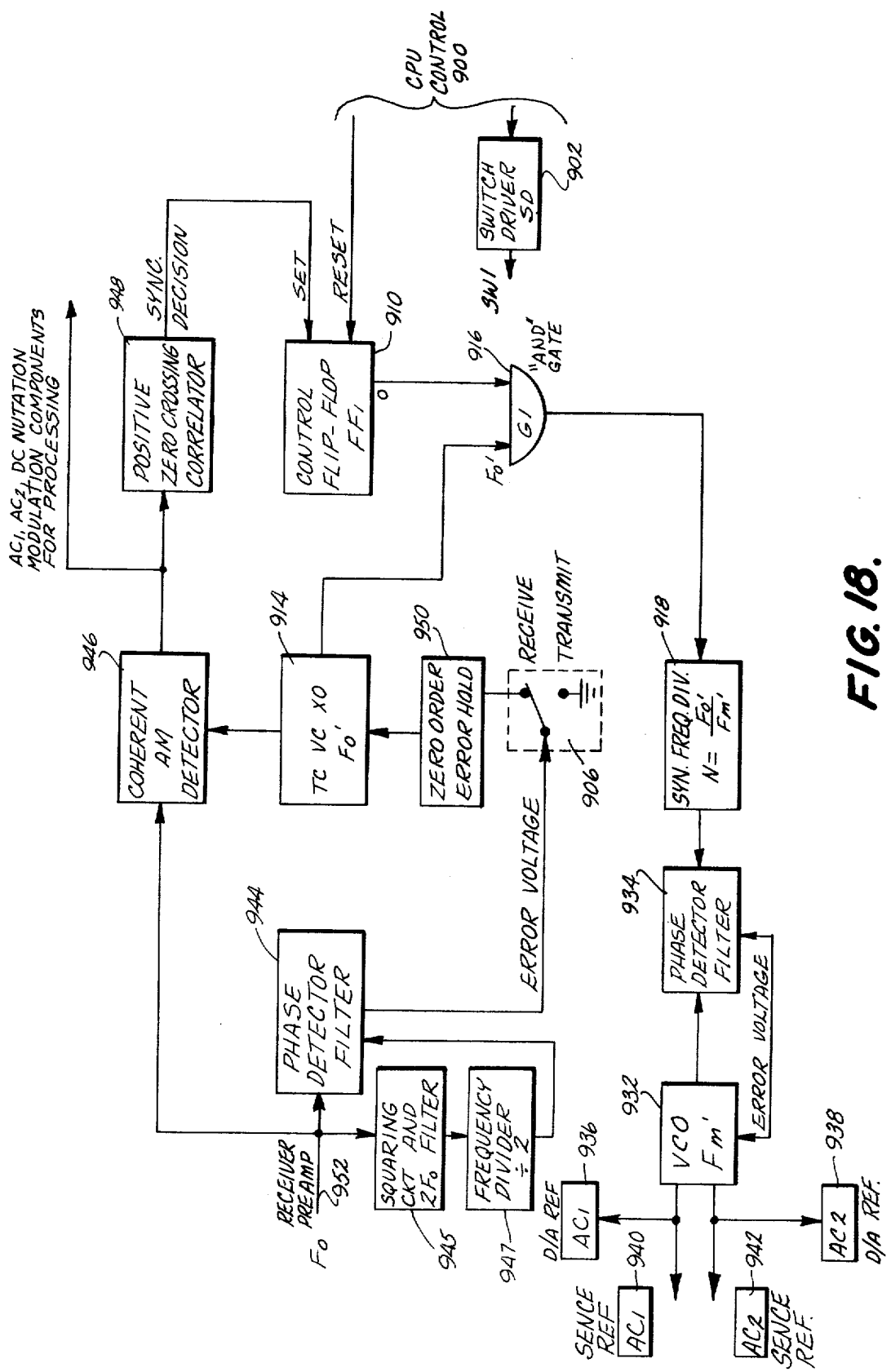
FIG. 18 is a schematic representation of a slave ranging system, used in accordance with an embodiment of this invention on the slave ranging body to assist the master ranging body in the determination of distance between two bodies free to move in three dimensions.

The signal comparison performed by the sense circuits 26 is more fully illustrated in FIG. 19. In FIG. 19, sense reference signal AC1 940 corresponds to sense reference signal 940 of FIG. 18, and sense reference signal AC2 942 corresponds to sense reference signal 942 of FIG. 18. FIG. 18 is fully described later in this specification. Signals AC1 940 and AC2 942 are used as reference signals, for the hereinafter discussed demodulation filters, because they have been phase-locked to the signal transmitted by the radiator. In FIG. 19, there are three sets of three different types of sensing circuits. These are the AC1 demodulation filters 1016 and 1020, the AC2 demodulation filters 1014 and 1018 and the DC modulation averaging circuits, 1021 and 1025. The demodulation filters perform an integration function over one nutation cycle on the product of the reference signal and the signal appearing on the appropriate line. In particular, and only by way of example, the output of AC2 demodulation filter 1014 provides a measure of the sin mt component existing on line 184 in a form useable by the matrix computer 1026. Similarly, the output of AC1 demodulation filter 1016 provides a measure of the cos mt component existing on line 184 in a form useable by the matrix computer 1026. The DC modulation averaging circuits perform an integration function over one nutation cycle on the signal appearing on the appropriate line. In particular, and only by way of example, the output of averaging circuit 1017 provides a measure of the average DC modulation component existing on line 184 in a form useable by the matrix computer 1026. The above discussion of the demodulation filters and averaging circuits applies equally to line 184, 186 and 188.

Finally, in order to maintain uniform sensitivity to errors in the sense circiuts, the input signals for any given state are normalized by computing and dividing each signal component by the RMS value of the total signal input vector. As is shown in FIG. 11, line 184 comes from sensor x-axis 92, line 186 comes from the sensor y-axis and line 188 comes from the sensor z-axis. Starting with line 184, if the radiator and sensor are pointing at each other, as determined by resolvers 220, 222 and 250, then their pointing axes will be aligned, and there will be no AC or DC modulation signal on line 184. In addition, if the pointing axes are aligned, there would be no $DC_2$ or $DC_3$ component on lines 186 and 188, respectively. Even though the sensor and radiator pointing axes are aligned, there could be relative roll existing about the aligned pointing axes. This relative roll would be detected by the signals present on lines 186 and 188 due to fields generated by the radiator pointing frame z- and y-axes, respectively. More specifically, if there were no roll angle error, then the sensor pointing frame z-axis would detect no signal from the radiator pointing frame y-axis. Therefore, if AC1 demodulation filter 1024 has an output $c_2 \cos mt$, it is a measure of the relative roll angle errors. In addition, if there were no relative roll angle errors, the sensor pointing frame y-axis would detect no signal from the radiator pointing frame z-axis. Therefore, if AC2 demodulation filter 1018 has an output $g_1$ sin mt, it also is a measure of the relative roll angles.

The outputs of filters 1018 and 1024 are input to matrix computer 1026 as data. Assuming that the radiator and sensor pointing frame y-axes are parallel, the signals received on lines 184 and 188 in this situation would be due to fields generated by the radiator pointing frame x- and z-axes. If there were no pointing angle $B_2$ error, then the sensor pointing frame x-axis would detect no signal from the radiator pointing frame z-axis. Therefore, if AC2 demodulation filter 1014 has an output $d_1$ sin mt, it is a measure of the error in pointing angle $B_2$. In addition, if there were no $B_2$ pointing angle error, the sensor pointing frame z-axis would detect no signal from the radiator pointing frame x-axis. If a DC modulation component $DC_3$ exists on line 188 as an output of averaging circuit 1025, it can be used as a measure of the $B_2$ pointing angle error. Finally, the output of AC2 demodulation filter 1022, $c_1$ sin mt, is the last measure of the $B_2$ pointing angle error measurable by matrix computer 1026.

The outputs of filters 1014 and 1022 and $DC_3$ are input to the matrix computer 1026 as data. Assuming that the radiator and sensor pointing frame z axes are parallel, the signals received on lines 184 and 186 in this situation would be due to fields generated by the radiator pointing frame x- and y-axes. If there were no pointing angle $A_2$ error, then the sensor pointing frame x-axis would detect no signal from the radiator pointing frame y-axis. Therefore, if AC1 demodulation filter 1016 has an output $d_2$ cos mt, it is a measure of the error in pointing angle $A_2$. In addition, if there were no $A_2$ pointing angle error, the sensor pointing frame y-axis would detect no signal from the radiator pointing frame x-axis. If a DC modulation component $DC_2$ exists on line 186 as an output of averaging circuit 1021, it can be used as a measure of the $A_2$ pointing angle error. The output of AC1 demodulation filter 1020, $g_2$ cos mt, is the last measure of the $B_2$ pointing angle error measurable by matrix computer 1026 with respect to the AC modulation components. The outputs of filters 1016 and 1020 and $DC_2$ are input to the matrix computer 1026 as data. Finally, the output of averaging circuit 1017, $DC_1$, can be used by the computer 1026 as a measure of both pointing angle errors under appropriate conditions, i.e., that both pointing angles are in error, in conjunction with the signals representative of individual pointing angle errors.

The matrix computer 1026 uses the input data to solve for errors in the pointing angles and roll angle $A_2$, $B_2$ and $\rho_2$ by using the matrix error equations (33)–(38) previously discussed, where $E_{\Delta a2}$, $E_{\Delta b2}$ and $E_{\Delta r2}$ represent the error matrices used for determining the body 20 pointing angle and roll errors $\Delta a_2$, $\Delta b_2$ and $\Delta r_2$. Stated in a differing, but equivalent, manner, the nine inputs to the matrix computer 1026 are used by the computer 1026 to establish a system transfer function matrix, W, defined in equations (21) and (22). The matrix computer 1026 can then solve for $E_{\Delta a2}$, $E_{66 b2}$ and $E_{\Delta r2}$. The sense circuits 26 have thus accepted as inputs the signals due to the excitation vector $f_0$ and provided a corresponding output excitation vector $f_7$.

The outputs of matrix computer 1026 are contained on lines 324, 321 and 317 and are expressed as three angular errors in the sensor pointing frame which can be related to the errors in the Euler angles $A_2$, $B_2$ and $\rho_2$. That is, the errors appearing on the x, y and z-axes of the frame which are contained on lines 317, 321 and 324, respectively, corresponds to the errors in the $\rho_2$, $B_2$ and $A_2$ Euler angles. The error signals appearing on lines 317, 321 and 324 are then processed by the error transformation circuitry 251 of FIG. 11, which converts these measurable pointing frame errors into appropriate Euler frame angular errors. The errors described signals processing as shown in FIG. 19 can be used for type of signal, whether continuous or discrete. Analyzing the processing of a discrete signal in sense circuits 26 would involve the same logic as utilized above. Once Euler angles $\rho_2$, $A_2$ and $B_2$ have been corrected, the orientation of sense reference frame is defined with respect to the sense pointing frame.

Accordingly, each of the angular errors defined in the radiator pointing frame is subjected to appropriate transformation to give the desired angular errors appropriate to the Euler angles in the transformation. As shown in FIG. 11, they are operated on by resolvers 315 and 316. Sense circuit 26 is connected to resolver 315 by an output line 317; resolver 315 is connected to resolver 316 by an output line 318; resolver 316 is connected to angle measuring circuit 100 by an output line 319. Sense circuit 26 is also connected to resolver 315 by an output line 321. Resolver 315 is connected by an output line 322 to angle measuring circuit 100. Sense circiut 26 is connected to a summer 323 by an output line 324. Summer 323 is connected by an output line 325 to resolver 316. Resolver 316 is connected to a high gain feedback amplifier or equivalent sample/hold integrator or summer 326 by an output line 327. Amplifier 326 is connected to an integrator or angle measuring circuit 100 by an output line 328. Amplifier 326 is also connected to summer 323 by an output line 402. Resolver 315 has an input 406 supplying angle $\rho_2$ from an output 218 of circuit 100. Resolver 316 has an input line 407 supplying angle $B_2$ from an output 216 of circuit 100. In operation, inputs on lines 317, 321 and 324 are transformed into the angular errors relating to $\rho_2$ and $B_2$ and $A_2$ as defined in the sense reference or receiver body frame.

The techniques used to derive the transformations performed on the outputs of sense circuit 26 are discussed in greater detail in U.S. Pat. No. 3,983,474, issued Sept. 28, 1978, to Jack Kuipers, the disclosure of which is herein incorporated by reference.

It is also desired to calculate the Euler angles relating the sense reference frame to radiator reference frame, i.e., $\psi$, $\theta$ and $\phi$. Given the availability of $A_1$ and $B_1$ on leads 229 and 231 coupled to resolvers 230 and 232, respectively, techniques for such calculations are taught in Kuipers' referenced paper. The connections for such a calculation are enclosed within dotted line 500 in FIG. 11. As shown in FIG. 11, resolver 232 is followed by a row of resolvers 501, 502, 503, 504, 505 and 506. These resolvers are connected in a closed loop from which information is taken and computed within a computer 507 having outputs 508, 509, 510 corresponding to the three Euler angles $\psi$, $\theta$ and $\phi$. Resolvers 501, 502 and 503 are connected to output leads 218, 216 and 214, respectively. Resolvers 504, 505 and 506 are connected to output leads 510, 509 and 508, respectively. Resolver 230 is connected to resolver 232 by a lead 511 and to resolver 501 by a lead 512. Resolver 232 is connected to resolver 502 by a lead 513 and to resolver 501 by a lead 514. Resolver 501 is connected to 503 by a lead 515 and to resolver 502 by a lead 516. Resolver 502 is connected to 503 by a lead 517 and to resolver 505 by a lead 518. Resolver 503 is connected to resolver 504 by a lead 519 and by a lead 520. Resolver 504 is connected to resolver 505 by a lead 521 and to resolver 506 by a lead 523 and by a lead 524. Resolver 506 is connected to resolver 230 by a lead 525 and 526 and to resolver 232 by a lead 527.

It can be appreciated that if only the Euler angles $p_2$, $B_2$ and $A_2$ are desired, encoder 219 and decoder 249 as well as all the circuitry within line 500 can be omitted. The aforementioned components are only necessary if the Euler angles $\psi$, $\theta$ and $\phi$ are desired relating the sense reference frame to the radiator reference frame.

It should be pointed out that the sequence of angles and their corresponding axes of rotation for the pointing coordinate transformation circuit 252 and the relative orientation coordinate transformation circuit 250 are not unique. That is, other angle definitions and rotation sequences can be used for the transformations subject to their having the required pointing and relative orientation freedom. It should be pointed out that the implementation of the invention can be done using state of the art techniques using digital, analog or hybrid circuitry.

Figure 17:
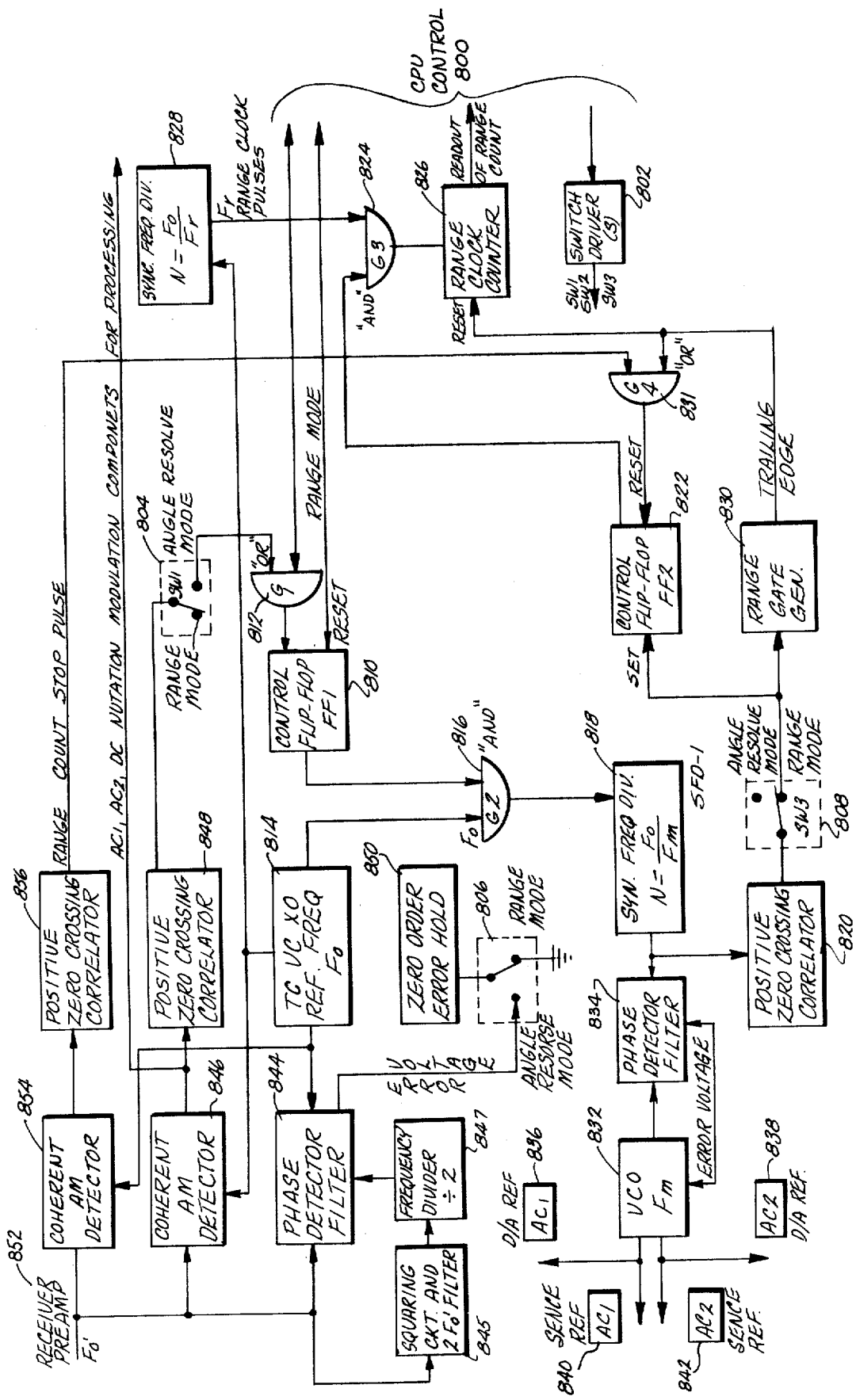
FIG. 17 is a schematic representation of a master ranging system, used in accordance with an embodiment of this invention on the master ranging body to determine the distance between two bodies free to move in three dimensions.

In the discussion above, it is to be understood that the sense circuits 26 are internally supplied with the components of the excitation signals from sources 68, 70 and 140 in order to logically perform the discriminating sensing function required of sensing circuits 26. The excitation signals are supplied from the phase-locking circuitry as shown in FIGS. 17 and 18 and as described in the discussion accompanying the two aforementioned Figures. The resolvers which form components of the circuitry described herein may be fabricated, by way of example, in accordance with the teachings of U.S. Pat. Nos. 3,187,169, issued June 1, 1965, and 2,927,734, issued Mar. 8, 1960. The sensing circuits, again by way of example, may also be fabricated in accordance with the teachings of a circuit diagram appearing at page 67 of the book entitled *Electronics Circuit Designers Casebook*, published by Electronics, McGraw-Hill, No. 14-6. The angle measuring circuitry may take the form of any of a vast number of closed-loop control circuits. There are, of course, numerous alternate constructions available for each of these components, as will be readily appreciated by those skilled in the art.

A detailed description of FIG. 11 has been previously presented. The following operational description is intended as an overview of the transponding relationship existing between body 10 and body 20. It is necessary in the preferred embodiment, as noted, that the bodies initially "acquire" one another. This is accomplished during the initial transponding transmissions and, thereafter, meaningful roll and/or orientation information is available at either body. The following discussion assumes that the acquisition period has passed insofar as body 10 is concerned and that body 10 is using the correct or near-correct pointing angles to body 20 in its initial transmission.

Body 10 excitation signals are applied along lines 141, 145 and 143 to the pointing angle encoding unit 219. Pointing angle encoding unit 219 encodes the pointing angles of the field radiated by body 10 with respect to the body 10 coordinate reference frame. The signal output of the pointing angle encoder is transformed through a coordinate transformation defined by resolvers 200 and 222. The output of the coordinate transformation is then applied to body 10 radiators and body 10 sends a signal to be received by body 20. As previously mentioned, this signal can be one of several formats.

Assuming the far-field condition prevails, body 20 will be able to detect the direction to body 10 because all of the radiated energy lies in a plane normal to the line connecting the bodies as viewed by body 20. If the nearfield condition prevails, body 20 would determine if there is a modulation component detectable.

The signals detected by body 20 are first applied to a pointing angle decoding unit 249 which informs body 20 as to the pointing angles of the field radiated by body 10 with respect to the body 10 coordinate reference frame. The signal output of the pointing angle decoding unit 249 is then applied to resolvers 250 through lines 172, 168 and 166 to determine the pointing angles of body 20 with respect to body 10 and the roll of body 20 about the mutually aligned pointing axes of body 10 and body 20. The roll angle, $p_2$, as determined by resolver 228 is based upon body 20's a priori knowledge of a reference state or phase shift in the excitation signals applied to body 10. The output of resolvers 250 on lines 184, 186 and 188 are applied to the sense circuits (which are more fully discussed in relation to FIG. 19), which compare these signals with the phaselocked sense reference signals AC1 and AC2, 940 and 942, respectively, generated by body 20 as shown in FIG. 18. The result of this comparison is a measure of the error angles.

Components 251 in FIG. 11 convert these error angle measurements from pointing frame errors to the appropriate Euler angle frame for all attitudes. The outputs of this conversion are fed to angle measuring circuits 100, and the outputs of this circuit are the error angles as determined by body 20. The result is, of course, a continuous measure of the pointing angles of body 20 with respect to body 10 in the body 20 coordinate reference frame and of the relative roll, $p_2$, of body 20 with respect to body 10 pointing frames. In addition, both bodies 10 and 20 have a continuous measure of the range of one body with respect to the other, as is shown in FIGS. 17 and 18. Finally, with the Euler angles $A_2$, $B_2$ and $p_2$, as discussed previously, and with the outputs of the pointing angle decoding unit 249, pointing angles $A_1$ and $B_1$, supplied to the unit 500 (contained within the dashed lines in FIG. 11) body 20 is able to determine the relative orientation of body 20 with respect to body 10.

Figure 10:
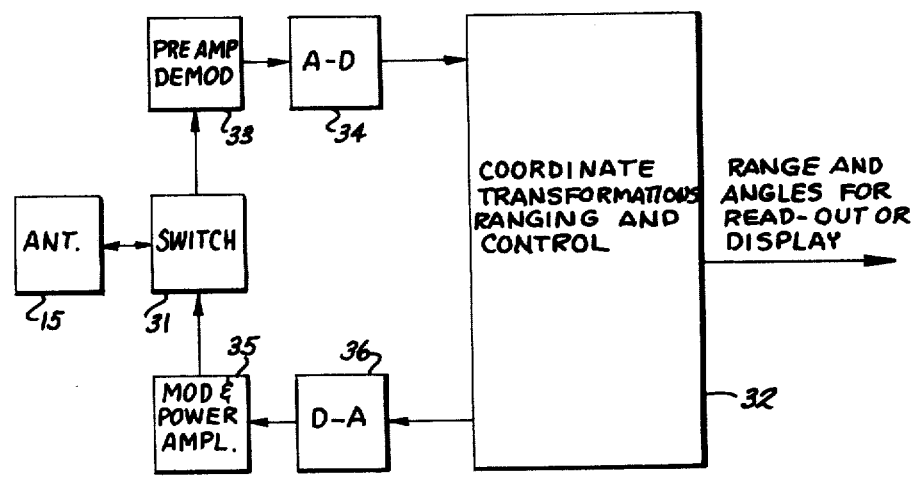
FIG. 10 is a block diagram of an antenna means and associated means for transmitting electromagnetic radiation, receiving electromagnetic radiation and performing coordinate transformations in accordance with an embodiment of this invention.

After processing the available information, body 20 will send a similar signal to body 10, from which body 10 will be able to determine if it has the correct pointing angles to body 20, roll angle and range of body 20. In addition, if the pointing angles from body 20 to body 10 in the body 20 coordinate reference frame have been encoded, body 10 may decode them and use them to determine relative orientation. With the information acquired by the transponding process, each body can determine its relative orientation with respect to and the direction to or relative position of the other body. This transponding process or its equivalent continues in order to provide a continuous measure in each of the two bodies of the pointing angles, relative roll angle and range to the other body. Continuously available at the other body, additionally, are the three angles measuring the rotational displacement of body 10 coordinate reference frame relative to body 20 coordinate reference frame—i.e., the orientation of each body relative to the other. Advantageously, bodies 10 and 20 both have transmitting and receiving capabilities, as shown in FIG. 10. Further, in steady-state with both bodies 10 and 20 having transmitting and receiving means, the pointing vector of body 10 points to body 20 and the pointing vector of body 20 points to body 10.

Ranging

An embodiment of this invention can also include the capability of being a full six-degree-of-freedom measurement system. That is, in addition to measuring the two pointing angles in each of the two remote bodies and the three angles measuring their relative orientation also available in each of the two bodies, a precise measure of the distance between the two bodies can be provided in each of the two bodies. This can be done using the internally generated and sensed nutating electromagnetic field structure already established and pointing between the two bodies or an appropriate subcarrier can be used for this purpose.

Using phase-locking techniques (such as those described in Alain Blanchard, *Phase-Locked Loops: Application to Coherent Receiver Design*, John Wiley & Sons, 1976, pages 351, et seq, the disclosure of which is herein incorporated by reference), on the modulation (nutation) signal sent between the two bodies, a precise measure of the distance between thw two bodies can be determined. With reference to FIGS. 9, 10 and 17, body 10 sends a nutating signal to body 20. Because body 10 has been arbitrarily picked to send the first signal in this particular ranging scheme, body 10 will be the master body in the ranging process, although both bodies could be equipped with master body circuitry, if desired. Body 10 is put into the ranging mode by a preprogrammed central processing unit (CPU) controller 800. The CPU controller 800 is preprogrammed to control switching from transmitting to receiving and back and to control the ranging system operation. The CPU is preprogrammed to switch from receiving to transmitting based on the receipt of certain information from the other body. Once this information is received, the CPU controller 800 causes body 10 to go into a transmit mode. After it transmits for a sufficient period, the controller 800 puts body 10 back into the receiving mode. The CPU controller 900 in body 20 (FIG. 18) works in the same manner.

Body 10 is put into the ranging mode by having the CPU 800 order the switch driver 802 to put all the switches, SW1 804, SW2 806 and SW3 808, into the ranging mode. Simultaneously, the CPU controller 800 sets control flip-flop FF1 810 to the "1" state through "OR" gate G1 812. A reference carrier frequency $F_0$ is internally generated in body 10 at block 814 by a temperature compensated voltage controlled crystal oscillator. Setting FF1 810 to the "1" state actuates "AND" gate G2 816 which allows $F_0$ pulses through G2 816 to the first synchronous frequency divider 818. This reference carrier frequency $F_0$ is reduced to a modulation frequency $F_m$, and phase-locked to the carrier $F_0$, by the first synchronous frequency divider 818.

The output of the first synchronous frequency divider 818 is monitored by a positive zero crossing correlator 820 and is used to detect the first positive going zero crossing at the output of the first synchronous frequency divider 818. When the first positive going zero crossing is detected, the correlator 820 sets control flip-flop FF2 822 to the "1" state, which activates "AND" gate G3 824. A range clock counter 826 is activated by G3 824, and accumulates clock range pulses from a second synchronous frequency divider 828 until a return signal received from body 20 deactivates it. A range gate generator 830 is simultaneously activated when the first positive going zero crossing is detected by correlator 820, and remains activated for a period corresponding to the maximum two-way ranging capability. If the range clock counter 826 has not been deactivated within this time period, the counter 826 will be turned off by the range gate generator 830. This is accomplished by resetting FF2 822 through "OR" gate G4 832, which deactivates the range clock counter 826 by deactivating "AND" gate G3 824, thus preventing pulses from frequency divider 828 from going through G3 824. Range gate generator 830 also resets the range clock counter 826 to zero when range has been exceeded. If body 20 is within the ranging capability, then counter 826 will give a readout of the distance to body 20.

The output of the first synchronous frequency divider 818 is continuously compared with the output of a voltage controlled oscillator 832 at the modulation frequency $F_m$ by a phase detector filter 834 which keeps the frequency $F_m$ of the voltage controlled oscillator 832 phase-locked to the reference carrier frequency $F_0$ supplied to the first synchronous frequency divider 818. The output of the voltage controlled oscillator 832 is used for two functions. D/A reference signals AC1 and AC2, 836 and 838, respectively, are used by block 36 of FIG. 10 as reference signals, and sense reference signals AC1 and AC2, 840 and 842, respectively, are used by sense circuits 26 when body 10 is in the receive mode to demodulate the nutation components received from body 20.

Body 10 will transmit for a period of time sufficient to allow body 20 to phase lock and synchronize its nutation modulation frequency $F_m$, at which time body 10 will be reverted to a receive mode by CPU controller 800 and will listen for signals from body 20.

Referring to FIG. 18, the CPU controller 900 in body 20 continuously keeps switch SW1 904 in the proper position through the switch driver 902. Upon receipt of a signal from body 10, over the input at the preamp 952 of body 20, body 20 phase locks an internally generated reference carrier frequency $F_0'$ 914 to the carrier frequency $F_0$, received from body 10. As in body 10, this is accomplished with a phase detector filter 944. When $F_0'$ is phase-locked to $F_0$, the modulation frequency $F_m$ appears at the output of a coherent AM detector 946. Again, a positive zero crossing correlator 948 is used to detect the first positive zero crossing of the output of the coherent AM detector 946. In addition, the output of the coherent AM detector 946 is supplied to the A/D converter 34 in FIG. 10 where it is subsequently processed to obtain information from which the relative position and/or orientation of body 20 with respect to body 10 can be determined. When the first positive zero crossing is detected, the correlator 948 sets control flip-flop FF1 910 to a "1" state, which activates "AND" gate G1 916 allowing the reference carrier frequency $F_0'$ to be simultaneously applied to a body 20 synchronous frequency divider 918, the output of which is a modulation signal at frequency $F_m'$. A voltage controlled oscillator 932 at frequency $F_m'$ is phase-locked to the output of the frequency divider 918 by a phase detector filter 934. Body 20 is then switched to the transmit mode by the CPU controller after it has been synchronized to body 10's signal and transmits a synchronized signal back to body 10. The zero order error hold unit 950 holds the phase error, detected by filter 944, between transponding cycles so that oscillator 914 is properly calibrated. Also, reference signals 936, 938, 940 and 942 are used in the same way the analogous signals are used in body 10.

Referring back to FIG. 17, the body 20 signal is received over the input at the preamp 852 of body 10. During the receipt of signals, the CPU controller 800 has the switch driver 802 reset all switches to the angle resolve mode. The signal is AM detected by AM detector 854 to remove the nutation modulation $F_m'$. A positive zero crossing correlator 856 is used to generate a range count stop pulse which freezes the accumulated count of the range clock counter 826 until it is read out. This is accomplished by resetting FF2 822 through "OR" gate G4 832, which deactivates "AND" gate G3 824, cutting off pulses from frequency divider 828 to the counter 826. The signal from body 20 is also applied to a coherent AM detector 846 and a phase detector filter 844. Once the reference frequency $F_0$ generated by oscillator 814 is phase-locked to the body 20 signal, the output of the coherent detector 846 is supplied to the A/D converter 34 of FIG. 10, where it is subsequently processed to obtain information from which the relative position and/or orientation of body 10 with respect to body 20 can be determined. In addition, a zero crossing of the coherent detector 846 output is used to start clocking pulses through "AND" gate G2 816 as previously described, which allows the continuous generation of reference signals 836, 838, 840 and 842.

When the radiator and sensor pointing frame x-axes are aligned in the far-field, no DC modulation will appear on the sensor pointing frame x-axis. To allow phase-locking to continue under this condition, squaring circuits, 845 and 945, and frequency dividers, 847 and 947, respectively, have been included in both bodies. In operation, components 845 and 945 receive an AC modulation carrier input and produce a signal of frequency $2F_0'$ and $2F_0$, respectively. This signal is divided in two by the frequency dividers, 847 and 947, and used by the phase detector filters 844 and 944 for phase-locking purposes.

Between transponding sequences, body 10 contains a zero order error hold network 850 which maintains the proper frequency correction of $F_0$ with respect to $F_0'$. CPU controllers 800 and 900 reset FF1 810 and FF1 910, respectively, so that the ranging process may be reinitiated when the CPU so orders.

Although the above described ranging system utilized a continuous signal, the system can also be utilized with a discrete state representation-type signal. As in the above described system, this is accomplished by establishing a reference state signal on the signal transmitted by body 10. Body 20 would include means for initiating the radiation of a return signal in response to the reference state signal. Body 10 would then determine the time delay between the radiation of the reference state signal and the reception of the return signal.

In summary, body 10 sends a nutating signal, with an established reference point, to body 20. Body 20 receives the modulated signal from body 10 and phase locks on this modulation. Body 20 will then send a return signal to body 10 with the phase of the modulation locked to that received from body 10. The phase of the signal received from body 20 is compared with the phase of the signal sent by body 10 to body 20, and the phase difference between the two signals is a measure which can be used for determining the distance between the two bodies. If, however, the actual distance between the two bodies exceeds one-half the wavelength of the nutation frequency, then potential ambiguities exist in the measurement of the distance. One way to avoid ambiguities is to choose the modulation frequency such that its wavelength is equal to two times the maximum distance expected in a given application. Distance is equal to [(phase difference) (velocity of light)] divided by [(4 nutation frequency)]. Range gate generator 830 determines whether the ranging system has exceeded its distance limitation and thus allows the ranging system to avoid the above described ambiguity.

Multiplexing

Referring to FIG. 10, even though the receiving and transmitting antennas can be two different physical structures, bodies 10 and 20 can advantageously have substantially identical receiving, transmitting and computational systems so bodies 10 and 20 can each transmit and receive signals to and from the other. Transmission and reception using the same antenna can be done using known multiplexing techniques which include time division, frequency division and phase division. As used here, frequency division is meant to include using two different carrier frequencies for transmission and reception.

For example, in one multiplexing system, antenna triad 15 is coupled to a switching means 31. Switching means 31 is, in turn, coupled to a coordinate transformation, ranging and control means 32 through a first series path including a demodulator and preamplifier 33 and an analog to digital converter 34, and a second series path including a modulator and power amplifier 35 and a digital to analog converter 36. For reception, switching means 31 selectively couples coordinate transformation, ranging and control means 32 to antenna triad 15 through the first series path. For transmission, switching means 31 selectively couples coordinate transformation, ranging and control means 32 to antenna triad 15 through the second series path. Coordinate transformation, ranging and control means 32 has an output for providing the value of the range and the pointing and orientation angles for monitoring, display or futher processing. Coordinate transformation, ranging and control means 32 is also coupled directly to 31 and controls switching between the two series paths. The coordinate transformations and ranging aspects of block 32 have been previously discussed. The control aspect of block 32 is handled by the aforementioned CPU controllers 800 and 900.

Compensation for Field Distortion

The accuracy of the two-way system depends (in the absence of noise and computational errors) upon the integrity of the magnetic field structure. Deviations from ideal radiator, ideal sensor and free space characteristics are called field distortion and can arise from imperfections in the magnetic radiator and sensor and because of the presence of metallic structure in the environment in which the system must operate. Through both the effects of conductivity and permeability, this structure can alter the structure of the electromagnetic field and cause a two-way system to produce erroneous position and roll readings. When the metallic structure is fixed in position and orientation with regard to the two-way radiator, it is generally possible to map the field structure and to compensate for the effects of the metallic structure, thus producing correct position and roll readings.

The imperfections in the three axis radiator and sensor can be described by fixed value matrices that include both rotation due to physical mounting of the radiator or sensor, gain and skewing due to cross-coupling between the axes. The distortions in a three axis sensor are equivalent to a fixed value matrix that converts the output of an ideal sensor into the output of the real sensor. The distortions in the three axis radiator are equivalent to the insertion of a fixed value matrix between the source excitation vector and the equivalent excitation of an ideal source. These effects are corrected by (a) determining the elements of the fixed value matrices through measurement and (b) inserting inverse matrices in either the hardware or software at the appropriate points in the signal processing. The elements of the sensor sensitivity matrix can be determined by measuring its responses on all three axes to three orthogonal fields produced by a Helmhotz coil. The elements of the radiator matrix can similarly be measured by exciting its three axes in each of three orientations and measuring the responses in the Helmholtz coil. Inclusion of the inverses of these matrices in the two-way computation then removes the measured distortion. This can be done either in the hardware by cross-coupling in the radiator excitation circuitry, or in the software by insertion of the inverse sensitivity matrix before $T_2$ in FIG. 9. In practice, a bore sighting rotation matrix is also included and the sensor imperfections are corrected by a Gram-Schmidt orthogonalization matrix.

When a two-way system is required to operate in an environment containing metallic structures, the complexity of the metallic structure in general precludes analytical prediction of the distorted fields. The alternating current magnetic fields used in the two-way system produce circulating currents in the nearby metallic structure, thereby generating the secondary alternating current magnetic fields and distorting the field pattern. In such an environment, the field structure can be mapped and then regarded simply as an environment with a position dependent field coupling matrix H(r). Error detection equations can then be derived using this H(r) matrix function rather than the field coupling matrix for free space conditions. (Note that the error detection equation would then be positioned dependent.)

COMMUNICATION OF A THIRD BODY POSITION

The tracking system previously described in FIG. 11 can be used to establish the relative position and orientation between two or more bodies. This tracking system will be referred to as "Two-Way" in the ensuing discussion. The tracking system can, in accordance with an embodiment of this invention, use serial transmission and arbitrary or "unit" magnitude signals having the actual field component magnitude encoded thereon. Further, the tracking system, either with or without the serial transmissions and unit magnitude signal, can be used to make known at a second body the position of a third body known with respect to a first body. That is, an embodiment of this invention can also include passing the position of the third body, known at the first body, from the first body to the second body. For convenience, this will be referred to as "hand-off" or "offset guidance" in subsequent discussion. The offset guidance capability is presented in the context of one application, a helicopter landing aid system. This system provides the means for a helicopter to land precisely on any of several selectable landing points without visual communication between the helicopter and the landing point.

Once two bodies establish a common pointing line between them, in accordance with the two-way discussion, pointing angles can be communicated between the two bodies to establish relative orientation. In accordance with an embodiment of this invention, the position of the third body is handed off from the first body to the second body by defining at the first body a pseudo reference frame with a known orientation with respect to the third body. In the two-way system, the reference frame of the first body with respect to the common pointing line is communicated to the second body. However, in accordance with an embodiment of this invention, the pseudo reference frame is communicated to the second body, thus giving an input for the computation of the position of the third body relative to the second body. Note that the second body need not necessarily know the relationship between the pseudo reference frame at the first body and the actual coordinate reference frame of the first body.

Figure 12:
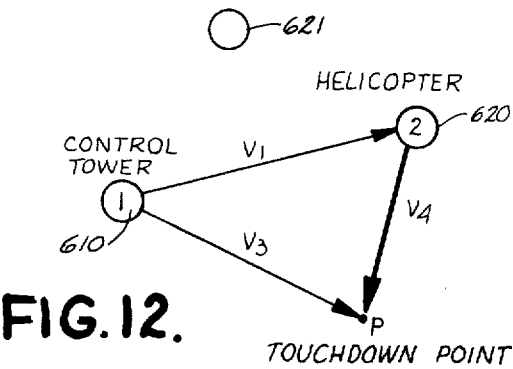
FIG. 12 is a schematic representation of three points and illustrates the problem of defining a touchdown point p with respect to a helicopter block 620 when point p is known with respect to a control tower block 610.

A typical helicopter landing situation is illustrated in FIG. 12. A body 610, such as a control tower, and a body 620, such as a helicopter, are both equipped with the "offset guidance" capability. By these means, helicopter body 620 is provided with a precise and continuous measure of the vector V4 which defines the relative position of the prescribed touchdown point P from helicopter body 620. Thus, helicopter body 620 has information describing where it must fly to touchdown.

A third antenna 621 is also shown in FIG. 12 merely to illustrate that the distance from tower body 610 to helicopter body 620 can be determined by triangulation, as an alternative. For certain applications requiring close-in precision, the triangulation method may offer greater accuracy. In this helicopter landing application, triangulation might be used in the terminal or landing area, whereas another distance measuring capability, such as those previously discussed, can be used for the long range navigation to the heliport. The purpose of either of the distance measuring options is to measure the range between tower body 610 and helicopter body 620.

Figure 13:
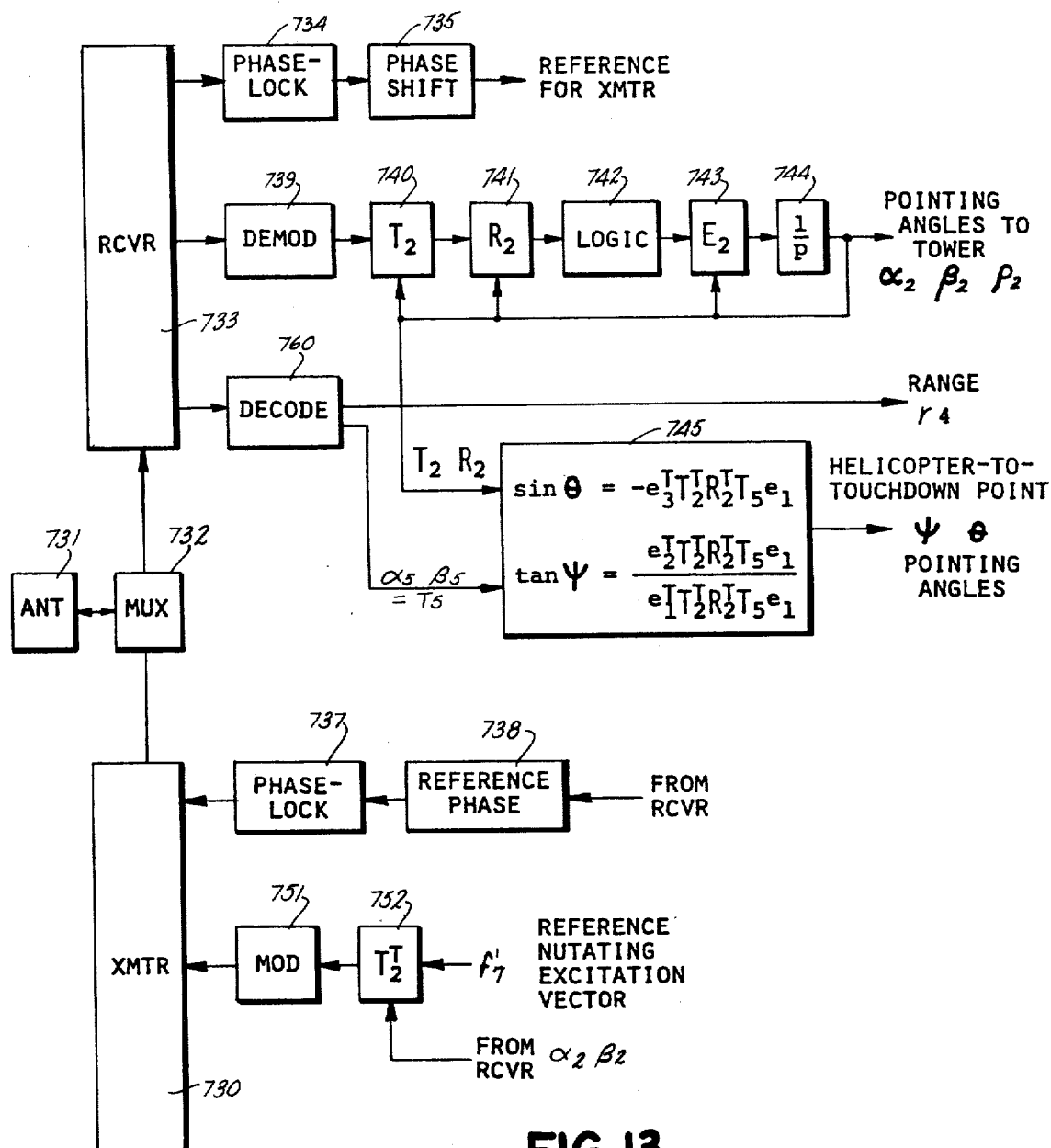
FIG. 13 is a block flow diagram of the processing of information at helicopter block 620.
Figure 14:
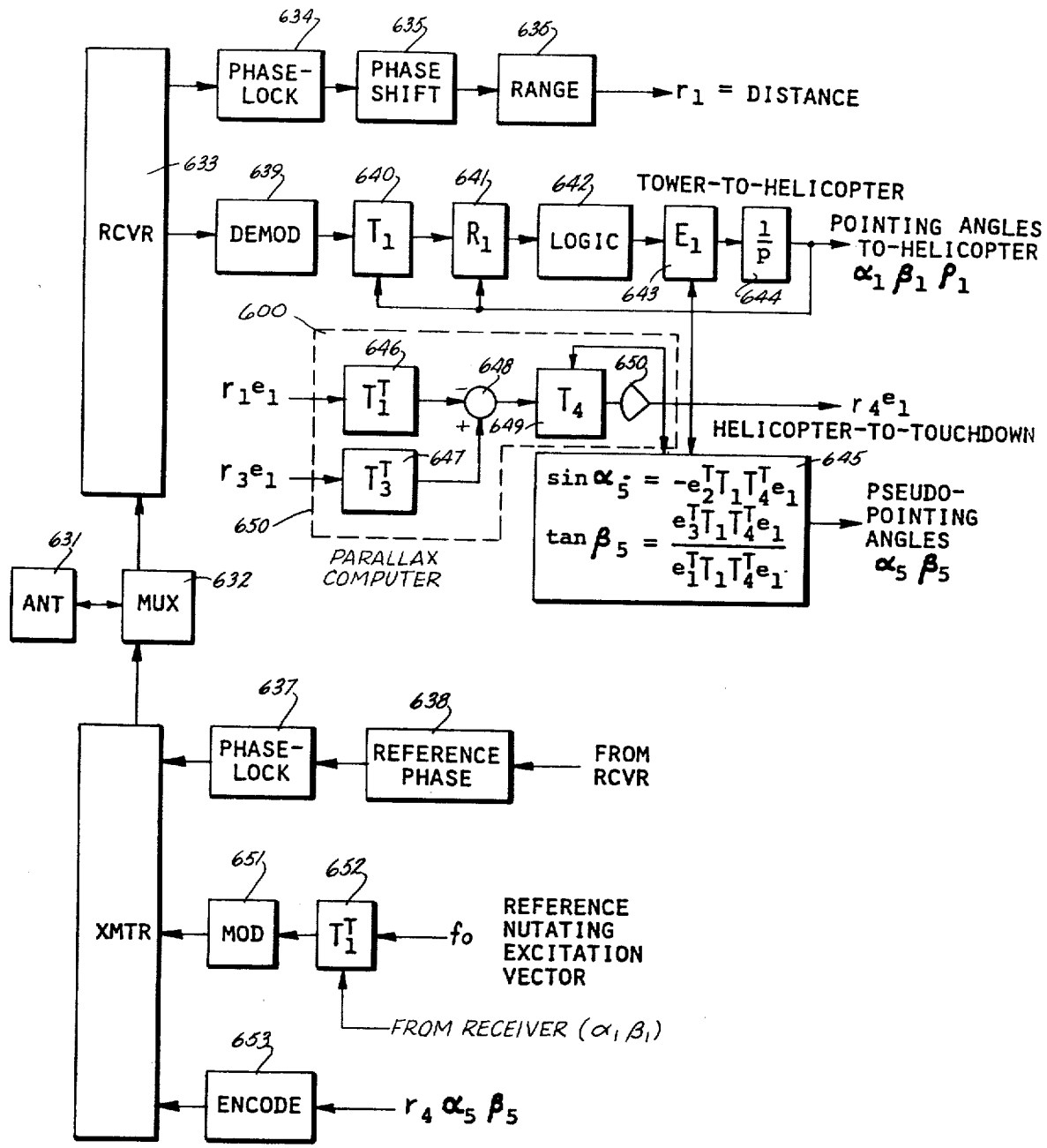
FIG. 14 is a block flow diagram of the processing of information at control tower block 610.

Generally, FIG. 13 shows the information flow in the helicopter body 620 and FIG. 14 shows the information flow in the tower body 610. Each of the block diagrams in FIGS. 13 and 14 generally follow a block diagram of a Two-Way system as shown in FIG. 11 and, more specifically, as previously described. The variations from FIG. 11 include a parallax computer within dotted line 600 in FIG. 14 which supplied a vector from helicopter body 620 to the touchdown point and the omission of the need to decode the pointing angles of the helicopter body 620 to the tower body 610 at tower body 10. In FIG. 13, the variations from FIG. 11 include the lack of the need to encode the pointing angles from the helicopter body 620 to the tower body 610.

Block Connection of Components in Tower

Referring to FIG. 14, the components at tower body 610 include a transmitter 630 coupled to an antenna 631 through a multiplexer 632. Multiplexer 632 switches antenna 631 between transmitter 630 and a receiver 633. The processing of information from receiver 633 includes a computation of the distance $r_1$ from control tower body 610 to helicopter body 620 by the use of a sequential coupling of a phase lock 634, phase shift 635 and ranger 636. As described elsewhere in more detail, range can be determined by establishing a common reference phase at two spaced bodies, determining the phase shift as the signal travels between the two bodies between which distance is to be measured, and determining the distance from the phase shift information.

Accordingly, transmitter 630 has an input connected to a phase lock 637 which, in turn, has an input connected to a reference phase 638. Receiver 633 further has an output for determining the pointing angles from tower body 610 to helicopter body 620 which is similar to the signal processing shown in FIG. 11 and includes in sequence, demodulator 639, coordinate transformer 640, coordinate transformation 641, logic processor 642, error determinator 643 and integrator 644. Coordinate transformers 640 and 641 include the transformation for $\alpha_1$, $\beta_1$ and $\rho_1$, logic processor 642 includes the determination of the rotation of the pointing vector radiated from helicopter body 620, error determinator 643 includes a transformation of the errors in $\alpha_1$, $\beta_1$ and $\rho_1$ into the Euler frame, and integrator 644 integrates the errors so a correction can be made to the angles $\alpha_1$, $\beta_1$ and $\rho_1$. These transformations have been thoroughly discussed earlier in this application.

A computational processor 645 determines the relative orientation between the tower body 610 reference coordinate system and the pseudo reference coordinate system, thereby providing the pseudo pointing angles. The output of integrator 644 provides a feedback input for coordinate transformers 640 and 641 and error determinator 643. Computation processor 645 has one input connected to the output of integrator 644 and another input connected to the output of a parallax computer 600. Parallax computer 600 includes a coordinate transformer 646 and a coordinate transformer 647 which have outputs applied to a summer 648 which, in turn is connected to a coordinate transformer 649. The output of coordinate transformer 649 goes to computation processor 645 through an integrator 650 which has an output coupled back to an input of coordinate transformer 649. Additional inputs to transmitter 630 include a sequential connection of a modulator 651 and a coordinate transformer 652 for applying a reference nutating excitation vector. An encoder 653 is coupled to transmitter 630 for encoding the pseudo pointing angles and the range between the touchdown point and helicopter body 620.

Block Connection of Components in Helicopter

Referring to FIG. 13, components having the same function as blocks in FIG. 14 are numbered with the same last two digits, the first digit being a 7 instead of a 6. That is, an antenna 731 is connected to a multiplexer 732, a transmitter 730, a receiver 733, a demodulator 739, a coordinate transformer 740, a coordinate transformer 741, a logic processor 742, an error determinator 743 and an integrator 744. Further, transmitter 730 is connected to a phase lock 737 and a reference phase 738. A pointing angle computation processor 745 receives an output from integrator 744. Integrator 744 also provides a feedback input to coordinate transformers 740 and 741 and logic processor 743. a decoder 760 receives information from receiver 733 and decodes the range from the helicopter to the landing point and the pseudo pointing angles, $\alpha_4$ and $\beta_5$, which are applied to pointing angle computation processor 745. A phase lock 734 receives an output from receiver 733 and is coupled to a phase shift 735. The sequential combination of a modulator 751 and a coordinate transformer 752 are applied to transmitter 730. Coordinate transformer 752 has an input supplying a reference nutating excitation vector and the pointing angles from the helicopter to the tower available at the output of integrator 744. The output of coordinate transformer 752 is coupled to transmitter 730 through a modulator 751.

Computational Strategy

As previously discussed, there can be provided in each body a precise and continuous measure of the two pointing angles and the range to the other body, plus the three Euler angles (or direction cosines) which define the relative orientation of the other body. In order to compute the orientation of tower body 610 relative to helicopter body 620 in helicopter body 620, the pointing angles of tower body 610 are required in helicopter body 620. That is, if the relative orientation is to be determined, then the pointing angles of the other body are required in the computing body. It is for this reason the local pointing angles are encoded on the signal transmitted to the other body.

In this "offset guidance" application, it is assumed that towr body 610 has locally specified a vector V3 from body 610 to point P, which defines the touchdown point P (input to coordinate transformer 647 in FIG. 14). The tower also continually measures a vector V1 from body 610 to body 620 (outputs of ranger 636 and integrator 644). Both of these vectors are defined in the reference frame of tower body 610. The difference of these two vectors defines a vector V4 from body 620 to point P, in the frame of body 610, and is computed by paralax computer 600.

The orientation of a pseudo reference frame is defined at tower body 610 such that the x-axis of this pseudo frame points in the locally computer direction of vector V4, point P to body 620. The two pseudo pointing angles which define the tower-to-helicopter direction of vector V1 relative to this pseudo reference frame can be computed at tower body 610. These pseudo pointing angles, instead of the actual pointing angles, are encoded on the nutating signal transmitted to helicopter body 620 (encoder 653 in FIG. 14). Using these decoded pseudo pointing angles, the orientation of the tower pseudo reference frame X-axis relative to the helicopter frame can be computed at helicopter body 620. The range from point P to helicopter body 620 can also be computed at tower body 610 and encoded for transmission to helicopter body 620 so that vector V4 from body 620 to point P is available in the helicopter reference frame at helicopter body 620. Determining vector V4 at helicopter body 620 is the objective of "offset guidance" when applied to a Helicopter Landing Aid System.

In summary (with reference to FIG. 14), the processing and computations at the tower include:

1. Determining the vector body 610 to P (input to coordinate transformer 647).
2. Continually measuring the vector body 610 to body 620 (input to coordinate transformer 646).
3. Computing from the above information, the vector V4, from body 620 to point P (output of coordinate transformer 649 and integrator 650).
4. Defining a tower pseudo reference frame whose x-axis is directed along the vector V4, from body 620 to point P.
5. Computing pseudo pointing angles of the body 610 to body 620 direction relative to the pseudo reference frame (output of computation processor 645).

6. Encoding the two pseudo pointing angles and the range of P to body 620 (see 3 above) on the nutating signal sent to the helicopter (encoder 653).

The processing and computations at helicopter body 620 include, with reference to FIG. 13:

1. Continually measuring the pointing angles and roll angle from helicopter to the tower (demodulator 739, coordinate transformers 740 and 741, logic processor 742, error determinator 743, integrator 744).

2. Decoding the pseudo/angles and range transmitted from tower body 610 (decoder 760 and computation processor 745).

3. Computing the transformation which defines the relative orientation of the pseudo reference frame.

4. Using the above information to compute the direction cosines of the vector V4, from body 620 to point P, in the helicopter reference frame at helicopter body 620 (computation processor 745).

5. Decoding the received encoded range measure to determine the distance to touchdown (decoder 760).

This transponding and computation processs is repeated many times per second with the result that the approaching helicopter is provided with a substantially continuous measure of the relative direction and range to the touchdown point. An embodiment of this invention can be such that no active participation by the helicopter pilot is required; the pilot merely flies the helicopter in accordance with the displayed information regarding his situation.

The computations performed at tower body 610 and the computations performed at helicopter body 620 are fiscussed in greater detail below.

Control Tower Computations

In this application, tower body 610 is supplying information so that helicopter body 620 can land at a point P, which is presumed to be known only at tower body 610. Both the tower and helicopter bodies are equipped with Two-Way. The objective is that the helicopter can determine vector V4, from point P to body 620, precisely and continuously in its frame from the nutating signals, either continuous or discrete, it receives from the tower. This is made possible by two special computations peculiar to "offset guidance". These computations are performed in the tower:

(1) Computation of the vector V4 (P to body 620) in the tower reference frame. The direction of this vector defines the x-axis direction of the pseudo reference frame.

(2) Computation of pseudo pointing angles relative to this pseudo reference frame. These angles define the direction of vector V1 (body 610 to body 620) relative to the pseudo reference frame. These computed pseudo angles are then encoded on the nutating signal transmitted by the tower to the approaching helicopter.

The above two computations performed at tower body 610 are discussed and derived in detail below.

Pseudo Reference Frame Computation

In accordance with known tracking systems, the vector V3 (body 610 to P) is determined with respect to a tower reference frame at tower body 610. The vector V1 (body 610 to body 620) is also determined with respect to the tower reference frame. Then the vector V4 (body 620 to P) is the computed difference:

$$V4 = V3 - V1 \tag{47}$$

as illustrated in FIG. 12.

Figure 15:
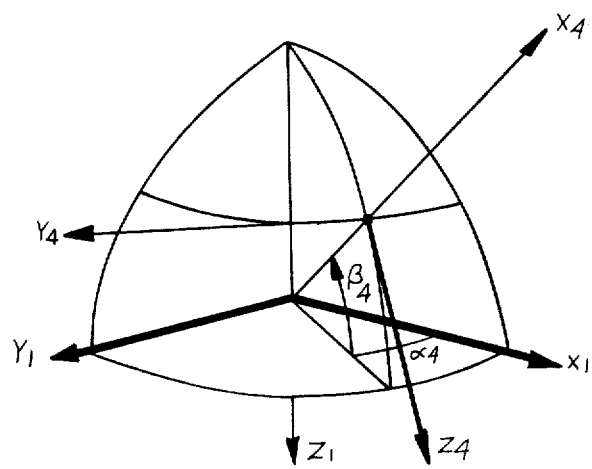
FIG. 15 shows the relationship of a pseudo reference frame to the actual reference frame at control tower block 610.

Depending upon the application and upon the internal organization of the required computations, it may be convenient to relates the directions of the vectors V1, V3 and V4 to the tower reference frame by coordinate transformations $T_1$, $T_3$ and $T_4$, respectively. Let $r_1$, $r_3$ and $r_4$ be the respective vector magnitudes of V1, V3 and V4, and define a unit vector $e = \text{col}(1, 0, 0)$. Then the computation of vector V4, shown schematically within parallax computer 600 in FIG. 14, is expressed in terms of the indicated coordinate transformations and distances. At summer 648 in the diagram, the vector V4 is expressed in tower coordinates. The output vector $r_4 e_1$ is this same vector directed along the x-axis of the computed pseudo frame, as required. The computed transformation $T_4$ relates the pseudo frame to the tower reference frame. The pseudo reference frame $x_4 y_4 z_4$, which is shown in FIG. 15, is related to the actual tower reference frame $x_1 y_1 z_1$ by the two indicated rotations $\alpha_4$ and $\beta_4$ which also serve to define the transformation $T_4$.

All of the foregoing coordinate transformations $T_K$ consist of simple rotations which are represented by matrices. That is, $$T_K = T_{\beta_K} T_{\alpha_K} = \begin{bmatrix} \cos\beta_K & 0 & -\sin\beta_K \\ 0 & 1 & 0 \\ \sin\beta_K & 0 & \cos\beta_K \end{bmatrix} \begin{bmatrix} \cos\alpha_K & \sin\alpha_K & 0 \\ -\sin\alpha_K & \cos\alpha_K & 0 \\ 0 & 0 & 1 \end{bmatrix} \tag{48}$$

Because these transformations are orthogonal, $T_K^{-1} = T_K^T =$ the transpose of $T_K$.

Pseudo Pointing Angle Computation

The direction of the vector V4 is now defined in the pseudo reference frame of the tower by two rotations, $\alpha_5$ and $\beta_5$. These are the two pseudo pointing angles. These two computed pseudo pointing angles are to be encoded on the nutating signal transmitted by the tower. Given these two pseudo pointing angles, the helicopter can compute the relative orientation of the tower pseudo reference frame x-axis. This x-axis direction is precisely the direction from the landing point P to helicopter body 620, defined in and with respect to the frame of the helicopter. Since the range $r_4$ was also encoded by the tower on the signal received by the helicopter, it is clear that the vector V4 is now defined in the helicopter frame.

Figure 16:
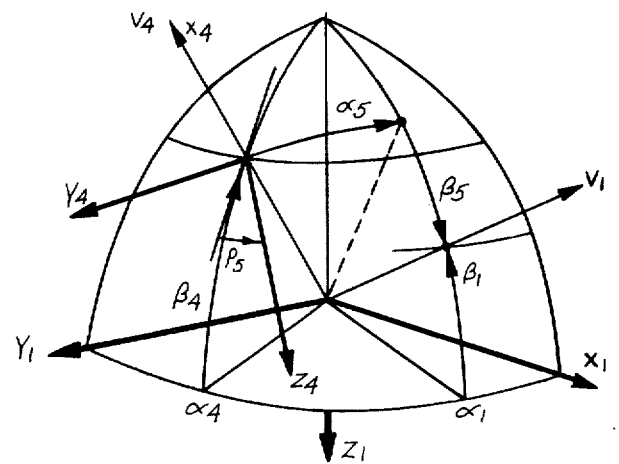
FIG. 16 is a representation showing the computation of the pseudo pointing angles relating the pseudo reference frame and the actual reference frame of control tower block 610.

As stated above, the computation of the pseudo pointing angles is performed in the tower. FIG. 16 shows the vector V1 and the vector V4, both defined in the actual tower reference frame. The vector V4 specifies the direction of the pseudo frame x-axis, as shown. The direction of V4 is defined in this pseudo reference coordinate frame by two pseudo pointing angles $\alpha_5$ and $\beta_5$, which are rotations about the $z_4$-axis and then about the new y-axis, respectively.

The various coordinate frames in FIG. 16 are related by a sequence of rotaions which are summarized in the matrix product $$T_5^T T_1^T T_4 R_5^T = I = \text{Identity matrix} \tag{49}$$

Where the matrix $R_5$ represents the relative roll (angle $\rho_5$) of the pseudo frame (between the indicated $\alpha_5$ and $\beta_4$ rotations shown in FIG. 16). However, the two pseudo angles, $\alpha_5$ and $\beta_5$, which define the transformation $T_5$ in equation (8) can be determined independent of this relative roll transformation by the equations:

$$\sin\alpha_5 = -e_2^T T_1 T_4^T e_1 \quad (50)$$

$$\tan\beta_5 = \frac{e_3^T T_1 T_4^T e_1}{e_1^T T_1 T_4^T e_1} \quad (51)$$

The transformations $T_K$ are defined by equation (7) and the unit column vector $_k$ is defined as having the $k^{th}$ component equal to one (1) and the other two components equal to zero.

In summary, the three numbers computed at tower body 610, namely, the two pseudo pointing angles $\alpha_5$ and $\beta_5$ and the range $r_4$, are encoded at tower body 610 onto the nutating signal transmitted by the tower to the helicopter. Typical encoding means include block 219 of FIG. 11 or block 653 of FIG. 14. However, although the tower encodes the pseudo pointing angles on its transmitted nutating signal, the tower uses its *actual pointing angles* to "point" its transmitted rotating or nutating signal at the approaching helicopter. The pointing, as discussed above, may include either encoding of the pointing direction with radiators in an arbitrary direction or physical radiation in the pointing direction. If the tower encoded its actual pointing angles on its signal, the helicopter would merely be able to compute the relative orientation of the tower, namely, the local vertical and north directions. This information may also be desirable and it is possible that both computations can be done in the same application by using time-shared encoding on alternate transmit times.

Helicopter Computations

As stated above, both the helicopter and the control tower are equipped with the two-way tracking system. Referring to FIG. 13, the helicopter two-way system performs the processing steps of:

(1) Determining the pointing angles $\alpha_2$ and $\beta_2$ which define the local direction to the tower (demodulator 739, coordinate transformers 740 and 741, determinator 743, integrator 744).

(2) Providing a phase-locked reference so that the range between helicopter and tower may be computed at least in the tower (phase lock 737 and reference phase 738).

(3) Decoding the pseudo angles $\alpha_5$ and $\beta_5$ and the range $r_4$, all of which are received from the tower (decoder 760).

(4) Computing vector V4 (P to body 620) which defines, at helicopter body 620, the relative positions of its touchdown point P (computation processor 745 for angles, decoder 760 for range).

(5) Using $\alpha_2$ and $\beta_2$ to transmit a nutating signal to tower body 610, thereby maintaining their common two-way pointing axis directions (coordinate transformers 752 and 751 and transmitter 730).

The computations made at helicopter body 620 are essentially those as discussed earlier when determining relative position and orientation between two bodies. However, it is understood that the relative orientation computation performed in the helicopter gives the relative orientation of the pseudo reference frame of the tower instead of the actual reference frame of the tower.

The specified vector V3, in the case of landing point P, would likely be permanently stored at the tower. Were the location of a moving target to be handed off, however, it would be necessary to instantaneously generate vector V3 in, for example, a scout aircraft. This can be accomplished, as will be readily appreciated, through the use of the apparatus and method described in U.S. Pat. No. 3,868,565. In such a case, computations described herein as being made at the tower would be made in the scout aircraft and the vector to the target handed off to another body, such as an attack aircraft.

The vector triangle formed by the control tower 610, the helicopter 620 and the touchdown point P, in the embodiment discussed, is solved for vector V4 in FIG. 12 by determining vectors V1 and V3, and the angle between vectors V1 and V3—i.e., by side-angle-side. The two-way signal processing strategy is equally applicable to a system in which bodies 610 and 620 are both helicopters, and to the scheme wherein two angles, one defined by vectors V1 and V3 and the other defined by vectors V1 and V4, and side V1 are utilized to determine the magnitude of vector V4 or V3—i.e., angle-side-angle. If, for example, each helicopter could see the remote object and it were desired to determine the distance to it from one or both of the helicopters, the pointing angles to the object would be consolidated in one of the coordinate frames and desired distance—i.e., the magnitude of vector V3 or V4—derived.

Various modifications and variations will no doubt occur to those skilled in the various arts to which this invention pertains. For example, in addition to electromagnetic fields, such fields as ultrasonic and optical may be used with appropriate radiating means, such as diaphragms or light sources. Further, the particular coding means employed in the nutating electromagnetic field may be chosen from any of numerous alternatives. Still further, the number of users of the tracking system and the coupling of the transmitting and receiving means may be varied from that disclosed above. These and all other variations which basically rely on the teachings through which this disclosure has advanced the art are properly considered within the scope of this invention as defined by the appended claims.

I claim:

1. Apparatus for determining a pointing angle to a first body from a second body comprising:

at least two independently oriented first body radiating means coupled to said first body and defining a first reference coordinate frame;

a first means for applying to said first body radiating means first actuating signals for producing a first field radiated in response to said first signals oscillating along a first line of generation and characterizing a first body pointing angle of a first pointing vector with respect to said first reference frame, said first field having receivable components characterized in that at said second body one direction in said first field has unique characteristics with respect to all other directions in said first field;

at least two independently oriented second body receiving means coupled to said second body and defining a second reference coordinate frame for detecting and measuring the receivable components of said first field; and a second body analyzing means coupled to said second body receiving means for converting said first field components into a second body pointing angle, from said second body to said first body, relative to said second reference coordinate frame.

2. Apparatus as recited in claim 1 further comprising:

at least two independently oriented second body radiating means coupled to said second body;

a second means for applying to said second body radiating means second actuating signals for producing, in response to said second signals, a second field oscillating along a second line of generation and characterizing said second pointing angle of said second pointing vector with respect to said second reference frame; said second field having receivable components characterized in that at said first body one direction in said second field has unique characteristics with respect to all other directions in said second field;

at least two independently oriented first body receiving means centered about the origin of said first reference coordinate frame for detecting and measuring the receivable components of said second field; and a first body analyzing means coupled to said first body receiving means for converting said second field components into a first body pointing angle, from said first body to said second body, relative to said first reference coordinate frame.

3. Apparatus as recited in claim 2 wherein said first means for applying signals includes means for including in said signals information characterizing said first body pointing angle from said first body to said second body with respect to said first reference coodinate frame.

4. Apparatus for determining second body pointing angles to a first body from a second body comprising:

independently oriented first body radiating means coupled to said first body and defining a first reference coordinate frame;

a first means for applying to said first body radiating means first actuating signals for radiating first field components rotating in a plane denoted a first plane of rotation and characterizing a first field, said first field having receivable components characterized in that, at said second body, one direction in said first field has unique characteristics with respect to all other directions in said first field and for at least partially characterizing the relative roll angle about an axis between said first and second bodies;

independently oriented second body receiving means coupled to said second body and defining a second reference coordinate frame for detecting and measuring the spatial components of said first field; and a second body analyzing means coupled to said second body receiving means for using said first field components to determine second body pointing angles, from said second body to said first body, relative to said second reference coordinate frame and for determining the relative roll angle about said axis.

5. Apparatus as recited in claim 4 wherein said first means for applying actuating signals includes means for at least partially characterizing the relative orientation between said first plane of rotation and said first reference coordinate frame.

6. Apparatus as recited in claim 5 further comprising:

independently oriented second body radiating means coupled to said second body;

a second means for applying to said second body radiating means second actuating signals for radiating second field components rotating in a plane denoted a second plane of rotation, and characterizing a second field, said field having receivable components characterized in that, at said first body, one direction in said second field has unique characteristics with respect to all other directions in said second field and for at least partially characterizing the relative roll angle between said first and second bodies about said axis, and the relative orientation between said second plane of rotation and said second reference coordinate frame;

independently oriented first body receiving means coupled to said first body for detecting and measuring spatial components of said second field; and a first body analyzing means coupled to said first body receiving means for using said second field components to determine first body pointing angles relative to said first reference coordinate frame, and determining the relative roll angle about said axis.

7. Apparatus for determining the direction and roll angle between first and second bodies relative to one another, each body having a coordinate reference frame, said apparatus comprising:

means for radiating a first field from said first body, said first field having components receivable at said second body from which said second body:

(a) can determine the direction to the first body with respect to the second body coordinate frame;

(b) can define the relative roll angle between said first body and said second body about said direction;

means at said second body for receiving said first field, said receiving means including:

(a) means for determining the direction to the first body with respect to the second body coordinate frame;

(b) means for defining the relative roll angle between said first body and said second body about said direction;

means for radiating a second field from said second body, said second field having components receivable at said first body from which said first body:

(a) can determine the direction to the second body with respect to the first body coordinate frame;

(b) can define the relative roll angle between said second body and said first body about said direction;

means at said first body for receiving said second field, said receiving means including:

(a) means for determining the direction to the second body with respect to the first body coordinate frame; and (b) means for defining the relative roll angle between said second body and said first body about said direction.

8. Apparatus as recited in claim 7 wherein:

said means for radiating each cycle of said first field comprises means for applying first actuating signals to at least two independently oriented first body electromagnetic field generating members; and said means for radiating each cycle of said second field comprises means for applying second actuating signals to at least two independently oriented second body electromagnetic field generating members.

9. Apparatus as recited in claim 8 wherein:

said means for applying first actuating signals includes means for applying a first set of signals to said first body generating members, each cycle of said signals providing at the second body as many independently measurable quantities as there are unknowns to be determined at the second body; and said means for applying second actuating signals includes means for applying a second set of signals to said second body generating members, each cycle of said signals providing at the first body as many independently measurable quantities as there are unknowns to be determined at the first body.

10. Apparatus as recited in claim 9 wherein:

said means for radiating each cycle of said first field from said first body includes means for directing the field so as to track said second body, said first directable field characterizing the direction of a first pointing vector defined by first body pointing angles with respect to the first coordinate reference frame; and said means for radiating each cycle of said second field from said second body includes means for directing the field so as to track said first body, said second directable field characterizing the direction of a second pointing vector defined by second body pointing angles with respect to the second coordinate reference frame.

11. Apparatus as recited in claim 10 wherein:
said means for applying first actuating signals includes means for applying during each cycle a set of discrete signals to said first generating members for radiating first discrete field pulses from said first body generating members, said discrete pulses containing at least two coordinate component carriers; and said means for applying second actuating signals includes means for applying during each cycle a set of discrete signals to said second generating members for radiating second discrete field pulses from said second body generating members, said discrete pulses containing at least two coordinate component carriers.

12. Apparatus as recited in claim 10 wherein:
said means for applying first actuating signals includes means for applying during each cycle four discrete signals to said first generating members for radiating four discrete field pulses from said first body generating members, said discrete pulses containing at least two coordinate component carriers; and said means for applying second actuating signals includes means for applying during each cycle four discrete signals to said second generating members for radiating four discrete field pulses from said second body generating members, said discrete pulses containing at least two coordinate component carriers.

13. Apparatus as recited in claim 10 wherein:
said means for applying first actuating signals to said first body radiating means includes means for producing in each cycle of said first field a radial component along said first pointing vector defined by first body pointing angles with respect to said first body coordinate reference frame thereby forming a first nutating field; and said second means for applying second acutating signals to said second body radiating means includes means for producing in each cycle of said second field a radial component along a second body pointing vector defined by second pointing angles with respect to said second body coordinate reference frame thereby forming a second nutating field.

14. Apparatus as recited in claim 9 wherein said first body receiving means includes a first means for determining the relative orientation of one of said first and second bodies relative to the other of said first and second bodies and said second body receiving means includes a second means for determining the relative orientation of one of said first and second bodies relative to the other of said first and second bodies.

15. Apparatus as recited in claim 7 or 14 wherein:
said means for applying first actuating signals to said first body generating members includes means for including in each cycle of said first field information from which the second body receiving means can determine the distance from said second body to said first body;

said means for applying second actuating signals to said second body generating members includes means for including in each cycle of said second field information from which the first body receiving means can determine the distance from said first body to said second body; and which further comprises means at said first and second bodies for determining said distance.

16. Apparatus as recited in claim 15 wherein said means for applying first actuating signals to said first body generating members includes means for including in each cycle of said first field phase reference means for establishing a reference point, said means for applying second actuating signals to said second body generating members includes means for including in each cycle of said second field phase reproduction means for establishing the same radiated phase in said second field as the phase of said first field when received at said second body, and said first receiving means includes phase comparison means for comparing at said first body the phase difference between the phase of said reference point of said first field and the phase of said first field when said second field is received with the phase of said reference point, thereby determining the separation distance between said first body and said second body.

17. Apparatus as recited in claim 8 wherein each of said radiating means includes at least three independently oriented electromagnetic field generating members and further comprises:

a first multiplexing means coupled to said first body generating member, coupled to said means for applying first actuating signals and coupled to said first receiving means, for permitting use of said first body generating members as said first body receiving means; and a second multiplexing means coupled to said second body generating members, coupled to said means for applying second actuating signals and coupled to said second receiving means, for permitting use of said second body generating members as said second body receiving means.

18. Apparatus as recited in claim 8 wherein:
said first and second fields having a frequency such that the ratio of the wavelength to the distance separating said bodies results in far-field characteristics at said receiving means, said characteristics being utilized by said receiving means for determining said directions.

19. The apparatus as set forth in claim 8 which further comprises:

means at said first body for defining pointing angles from said first body to a remote object relative to said first body coordinate reference frame; and means at one of said bodies for translating said angles from the first body to said second body coordinate reference frame.

20. The apparatus as set forth in claim 8 which further comprises:

means at said first body for defining a first body object vector to a remote object, said vector being defined initially relative to the coordinate reference frame of said first body;

means at one of said bodies for translating said vector from the first body to the second body coordinate reference frame.

21. The apparatus as set forth in claim 20 wherein said translating means comprises:

means for determining the distance between said first and second bodies at said first body, said distance along with said direction to the second body establishing a reference vector between said first and second bodies;

means at said first body for determining a third vector, said third vector being the third side of a vector triangle including said reference vector and said first body-object vector;

means for establishing at said first body a pseudo coordinate reference frame, said frame having one of its axes defined by said third vector and being displaced from said first body coordinate reference frame through a series of two angles; and means for transmitting to said second body from said first body;

(a) the pointing angles to the second body from the first body relative to said pseudo frame; and (b) the magnitude of said third vector.

22. The apparatus as set forth in claim 8 which further comprises:

a remote object;

means at said first body for measuring the distance between said first and second bodies, said distance, in conjunction with said direction to said second body defining a reference vector between said first and second bodies, said reference vector forming one side of a vector triangle, the points of which are coincident with said first and second bodies and said remote object;

means for supplying to said first body at least two component values of said triangle other than said reference vector rendering the same solvable; and means at said first body for solving said triangle for the desired component value.

23. Apparatus for determining the direction between and relative orientation of a second body relative to a first body, each body having a coordinate reference frame, said apparatus comprising:

means for radiating a first vector field from said first body, the frequency of said field being such that the ratio of the wavelength to the distance separating said bodies results in far-field reception characteristics at said second body, each cycle of said first field having components receivable at said second body and processable to produce at said second body at least five independent measurements from which said second body:

(a) can compute the direction to the first body with respect to the second body coordinate reference frame; and (b) can compute the rotation of said first body coordinate reference frame with respect to said second body coordinate reference frame;

means at said second body:

(a) for receiving and processing said first field to produce said five independent measurements;

(b) for computing the direction to the first body with respect to the second body coordinate reference frame, said direction computing means utilizing the far-field characteristics of said field; and (c) for computing the rotation of said first body coordinate reference frame with respect to said second body reference frame.

24. Apparatus as recited in claim 23 wherein:

said means for radiating each cycle of said first field comprises means for applying first actuating signals to at least two independently oriented first body electromagnetic field generating member.s

25. Apparatus as recited in claim 24 wherein:

said means for applying first actuating signals includes means for applying a first set of signals to said first body generating members, each cycle of said signals providing at the second body as many independently measurable quantities as there are unknowns to be determined at the second body.

26. Apparatus as recited in claim 24 wherein:

said means for radiating each cycle of said first field from said first body includes means for directing the field so as to track said second body;

said first directable field characterizing the direction of a first body pointing vector defined by first body pointing angles with respect to said first coordinate reference frame.

27. Apparatus as recited in claim 26 wherein:

said means for applying first actuating signals includes means for applying a set of discrete signals to said first generating member for radiating first discrete field pulses from said first body generating members, said discrete pulses containing at least two coordinate component carriers.

28. Apparatus as recited in claim 26 wherein:

said means for applying first actuating signals includes means for applying four discrete signals to said first generating members for radiating four discrete field pulses from said first body generating members, said discrete pulses containing at least two coordinate component carriers.

29. Apparatus as recited in claim 26, 27 or 28 wherein:

said means for applying first actuating signals to said first body radiating means includes means for producing in each cycle of said first field a radial component along said first pointing vector defined by first body pointing angles with respect to said first body coordinate reference frame thereby forming a first nutating field.

30. Apparatus as recited in claim 26 wherein:

said means for applying first actuating signals to said first body generating members includes means for including in each cycle of said first field information characterizing said first body pointing angles from said first body to said second body with respect to said first body reference coordinate frame.

31. Apparatus as set forth in claim 24 for further determining the direction between and relative orientation of said first body relative to said second body, said apparatus comprising:

means for radiating a second field from said second body, the frequency of said field being such that the ratio of the wavelength to the distance separating said bodies results in far-field reception characteristics at said first body, each cycle of said second field having components receivable at said first body and processable to produce at said first body at least five independent measurements from which said first body:

(a) can compute the direction to the second body with respect to the first body coordinate reference frame; and (b) can compute the rotation of said second body coordinate reference frame with respect to said first body coordinate reference frame;

means at said first body:

(a) for receiving and processing said second field to produce said five independent measurements;
(b) for computing the direction to the second body with respect to the first body coordinate reference frame, said direction computing means utilizing the far-field characteristics of said field; and
(c) for computing the rotation of said second body coordinate reference frame with respect to said first body coordinate reference frame.

32. Apparatus as set forth in claim 31 wherein said means for radiating each cycle of said second field comprises means for applying second actuating signals to at least two independently oriented second body electromagnetic field generating members.

33. Apparatus as recited in claim 23 further comprising means at said second body for determining the distance from said second body to said first body.

34. Apparatus as recited in claim 32 wherein:
said means for applying first actuating signals to said first body generating members includes means for including in each cycle of said first field information with which the second body receiving means can determine the distance from said second body to said first body; and
said means for applying second actuating signals to said second body generating members includes means for including in each cycle of said second field information with which the first body receiving means can determine the distance from said first body to said second body.

35. Apparatus as recited in claim 34 wherein said means for applying first actuating signals to said first body generating members includes means for including in each cycle of said first field phase reference means for establishing a reference point, said means for applying second actuating signals to said second body generating members includes means for including in each cycle of said second field phase reproduction means for establishing the same radiated phase in said second field as the phase of said first field when received at said second body and said first receiving means includes phase comparison means for comparing at said first body the phase difference between the phase of said reference point of said first field and the phase of said first field when said second field is received with the phase of said reference point, thereby determining the separation distance between said first body and said second body.

36. Apparatus as recited in claim 29 wherein each of said radiating means includes at least three independently oriented electromagnetic field generating members and which further comprises:
a first multiplexing means coupled to said first body generating member, coupled to said means for applying first actuating signals and coupled to said first receiving means, for permitting use of said first body generating members by both said first actuating means and said first receiving means; and
a second multiplexing means coupled to said second body generating members, coupled to said means for applying second actuating signals and coupled to said second receiver means, for permitting use of said second body generating members by both said second actuating means and said second receiving means.

37. The apparatus as set forth in claim 23 which further comprises means at said first body for defining pointing angles from said first body to a remote object relative to said first body coordinate reference frame; and
means at one of said bodies for translating said angles from the first body to said second body coordinate reference frame.

38. The apparatus as set forth in claim 23 which further comprises means at said first body for defining a first body object vector to a remote object, said vector being defined initially relative to the coordinate reference frame of said first body;
means at one of said bodies for translating said vector from the first body to the second body coordinate reference frame.

39. The apparatus as set forth in claim 23 which further comprises:
a remote object;
means at said second body for measuring the distance between said first and second bodies, said distance, in conjunction with said direction defining a reference vector between said second and first bodies, said reference vector forming one side of a vector triangle, the points of which are coincident with said first and second bodies and said remote object;
means for supplying to said second body at least two component values of said triangle other than said reference vector rendering the same solvable; and
means at said second body for solving said triangle for the desired component value.

40. Apparatus for determining the direction between and relative orientation of first and second bodies relative to one another, each body having a coordinate reference frame, said apparatus comprising:
means for radiating a first field from said first body, each cycle of said first field having components receivable at said second body and processable to produce at said second body at least five independent measurements from which said second body:
(a) can compute the direction to the first body with respect to the second body coordinate reference frame; and
(b) can compute the rotation of said first body coordinate reference frame with respect to said second body coordinate reference frame;
means at said second body:
(a) for receiving and processsing said first field to produce said five independent measurements;
(b) for computing the direction to the first body with respect to the second body coordinate reference frame; and
(c) for computing the rotation of said first body coordinate reference frame with respect to said second body coordinate reference frame;
means for radiating a second field from said second body, each cycle of said second field having components receivable at said first body and processable to produce at said first body at least five independent measurements from which said first body:
(a) can compute the direction to the second body with respect to the first body coordinate reference frame; and
(b) can compute the rotation of said second body coordinate reference frame with respect to said first body coordinate reference frame;
means at said first body:
(a) for receiving and processing said second field to produce said five independent measurements;
(b) for computing the direction to the second body with respect to the first body coordinate reference frame; and (c) for computing the rotation of said second body coordinate reference frame with respect to said first body coordinate reference frame.

41. Apparatus as recited in claim 40 wherein:

said means for radiating each cycle of said first field comprises means for applying first actuating signals to at least two independently oriented first body electromagnetic field generating members; and said means for radiating each cycle of said second field comprises means for applying second actuating signals to at least two independently oriented second body electromagnetic field generating members.

42. Apparatus as recited in claim 41 wherein:

said means for radiating each cycle of said first field from said first body includes means for directing the field so as to track said second body, said first directable field characterizing the direction of a first pointing vector defined by first body pointing angles with respect to said first coordinate reference frame; and said means for radiating each cycle of said second field from said second body includes means for directing the field so as to track said first body, said second directable field characterizing the direction of a second pointing vector defined by second body pointing angles with respect to said second coordinate reference frame.

43. Apparatus as recited in claim 42 wherein:

said means for applying first actuating signals includes means for applying a set of discrete signals to said first generating members for radiating first discrete field pulses from said first body generating members, said discrete pulses containing at least two coordinate component carriers; and said means for applying second actuating signals includes means for applying a set of discrete signals to said second generating members for radiating second discrete field pulses from said second body generating members, said discrete pulses containing at least two coordinate component carriers.

44. Apparatus as recited in claim 43 wherein:

said means for applying first actuating signals to said first body radiating means further includes means for producing in each cycle of said first field a radial component along said first pointing vector, thereby forming a first nutating field; and said second means for applying second actuating signals to said second body radiating means further includes means for producing in each cycle of said second field a radial component along said second body pointing vector, thereby forming a second nutating field.

45. Apparatus as recited in claim 42 wherein:

said means for applying first and second actuating signals to said first and second generating members further includes means for including in each cycle of said fields information from which said first and second body receiving means can determine the relative roll angle between said first and second bodies about their mutually aligned pointing vectors; and means at said first and second body receiving means for determining the relative roll angle between said first and second bodies about their mutually aligned pointing vectors.

46. Apparatus as recited in claim 45 wherein:

said means for applying first actuating signals to said first body generating members includes means for including in said first field information characterizing said first body pointing angles from said first body to said second body with respect to said first body reference coordinate frame; and said means for applying second actuating signals to said second body generating members includes means for including in said second field information characterizing said second body pointing angles from said second body to said first body with respect to said second body reference coordinate frame.

47. Apparatus as set forth in claim 41 which further comprises means at at least one of said bodies for determining the distance between said first and second bodies.

48. Apparatus as recited in claim 41 wherein each of said radiating means includes at least three independently oriented electromagnetic field generating members and which further comprises:

a first multiplexing means coupled to said first body generating members, coupled to said means for applying first actuating signals and coupled to said first receiving means, for permitting use of said first body generating members by both said first actuating means and said first receiving means; and a second multiplexing means coupled to said second body generating members, coupled to said means for applying second actuating signals and coupled to said second receiving means, for permitting use of said second body generating members by both said second actuating means and said second receiving means.

49. The apparatus as set forth in claim 40 which further comprises means at said first body for defining pointing angles from said first body to a remote object relative to said first body coordinate reference frame; and means at one of said bodies for translating said angles from the first body to said second body coordinate reference frame.

50. The apparatus as set forth in claim 40 which further comprises means at said first body for defining a first body object vector to a remote object, said vector being defined initially relative to the coordinate reference frame of said first body;

means at one of said bodies for translating said vector from the first body to the second body coordinate reference frame.

51. The apparatus as set forth in claim 50 wherein said translating means comprises:

means for determining the distance between said first and second bodies at said first body, said distance along with said direction to the second body establishing a reference vector between said first and second bodies;

means at said first body for determining a third vector, said third vector being the third side of a vector triangle including said reference vector and said first body-object vector;

means for establishing at said first body a pseudo coordinate reference frame, said frame having one of its axes defined by said third vector and being displaced from said first body coordinate reference frame through a series of two angles; and means for transmitting to said second body from said first body:

(a) the pointing angles to the second body from the first body relative to said pseudo frame; and (b) the magnitude of said third vector.

52. The apparatus as set forth in claim 40 which further comprises:

a remote object;

means at said second body for measuring the distance between said first and second bodies, said distance, in conjunction with said direction to said first body defining a reference vector between said second and first bodies, said reference vector forming one side of a vector triangle, the points of which are coincident with said first and second bodies and said remote object;

means for supplying to said second body at least two component values of said triangle other than said reference vector rendering the same solvable; and means at said second body for solving said triangle for the desired component value.

53. Apparatus for determining a second body object vector from a second body to a remote object, said apparatus including a first body, said first and second bodies having coordinate reference frames, said first body having a priori knowledge of the angles and magnitude of a first body object vector between the first body and the object, said apparatus comprising:

means for radiating a first field from said first body, said first field having components receivable at said second body from which said second body:

(a) can determine the direction to the first body with respect to the second body coordinate frame;

(b) can define the relative roll angle between said first body and said second body about said direction;

means at said second body for receiving said field, said receiving means including:

(a) means for determining the direction to the first body with respect to the second body coordinate frame;

(b) means for defining the relative roll angle between said first body and said second body about said direction;

means for radiating a second field from said second body, said second field having components receivable at said first body from which said first body can determine the direction to the second body with respect to the first body coordinate frame;

means at said first body for receiving said field, said receiving means including means for determining the direction to the second body with respect to the first body coordinate frame;

means at said first body for determining the distance between said first body and said second body, said distance along with said direction to the second body establishing a reference vector between said first and second bodies;

means at said first body for determining a third vector, said third vector being the third side of a vector triangle including said reference vector and said first body object vector, the direction of said third vector being determined relative to said first body coordinate reference frame;

means for establishing at said first body a pseudo coordinate reference frame, said pseudo frame having one of its axes defined by said third vector and being displaced from said first body coordinate reference frame through a series of two angles;

means for transmitting to said second body from said first body:

(a) the direction to the second body from the first body relative to said pseudo frame; and (b) the magnitude of said third vector.

54. The apparatus as set forth in claim 53 wherein one of said first body receiving and second body radiating means comprises at least two independently oriented electromagnetic field antennas; wherein the other of said first body receiving and second body radiating means comprises at least three independently oriented electromagnetic field antennas; wherein one of said first body radiating and second body receiving means comprises at least two independently oriented electromagnetic field antennas; and wherein the other of said first body radiating and second body receiving means comprises at least three independently oriented electromagnetic field antennas.

55. Apparatus as set forth in claim 54 wherein said means for radiating includes means for directing the field so as to track the receiving body.

56. Apparatus as set forth in claim 55 wherein each of said fields comprises a set of discrete field pulses, said pulses containing at least two coordinate component carriers.

57. Apparatus as set forth in claim 56 wherein each discrete pulse contains a radial component, thereby forming a nutating field.

58. Apparatus as set forth in claim 54 wherein said receiving and radiating antennas at each body comprise single antennas and which further includes means for multiplexing said antennas between receiving and radiating functions.

59. A process for determining the direction and roll angle between first and second bodies relative to one another, each body having a coordinate reference frame, said process comprising the steps of:

radiating a first vector field from said first body, said first field having components receivable at said second body from which said second body:

(a) can determine the direction to the first body with respect to the second body coordinate frame;

(b) can define the relative roll angle between said first body and said second body about said direction;

receiving said first field at said second body and:

(a) determining the direction to the first body with respect to the second body coordinate frame;

(b) defining the relative roll angle between said first body and said second body about said direction;

radiating a second vector field from said second body, said second field having components receivable at said first body from which said first body:

(a) can determine the direction to the second body with respect to the first body coordinate frame;

(b) can define the relative roll angle between said second body and said first body about said direction;

receiving said second field at said first body and:

(a) determining the direction to the second body with respect to the first body coordinate frame; and (b) defining the relative roll angle between said second body and said first body about said direction.

60. The process as set forth in claim 59 wherein said radiating steps include the step of applying actuating signals to at least two independently oriented magnetic field generating members.

61. The process as set forth in claim 60 which further comprises the step of directing said first and second vector fields toward said second and first bodies, respectively.

62. The process as set forth in claim 60 wherein said first and second fields have components receivable and processable to produce at least five independent measurements and which further comprises the steps of computing the rotation of each coordinate reference frame with respect to the other.

63. The process as set forth in claim 59 further comprising the step of determining the distance between said first and second bodies at one of said bodies.

64. A process for determining the direction between and relative orientation of a second body relative to a first body, each body having a coordinate reference frame, said process comprising the steps of:

radiating a first vector field from said first body, the frequency of said field being such that the ratio of the wavelength to the distance separating said bodies results in far-field reception characteristics at said second body, each cycle of said first field having components receivable at said second body and processable to produce at said second body at least five independent measurements from which said second body:

(a) can compute the direction to the first body with respect to the second body coordinate reference frame; and (b) can compute the rotation of said first body coordinate reference frame with respect to said second body coordinate reference frame;

receiving and processing said first field at said second body to produce said five independent measurements;

computing at said second body the direction to the first body with respect to the second body coordinate reference frame, said direction computing step utilizing the far-field characteristics of said field; and computing at said second body the rotation of said first body coordinate reference frame with respect to said second body reference frame.

65. The process as set forth in claim 64 wherein said radiating step includes the step of applying actuating signals to at least two independently oriented magnetic field generating members.

66. The process as set forth in claim 65 which further comprises the step of directing said first and second vector fields toward said second and first bodies, respectively.

67. A process for determining the direction between and the relative orientation of first and second bodies relative to one another, each body having a coordinate reference frame, said process comprising the steps of:

radiating a first vector field from said first body, each cycle of said first field having components receivable at said second body and processable to produce at said second body at least five independent measurements from which said second body:

(a) can compute the direction to the first body with respect to the second body coordinate reference frame; and (b) can compute the rotation of said first body coordinate reference frame with respect to said second body coordinate reference frame;

receiving and processing said first field at said second body to produce said five independent measurements;

computing at said second body the direction to the first body with respect to the second body coordinate reference frame; and computing at said second body the rotation of said first body coordinate reference frame with respect to said second body coordinate reference frame;

radiating a second vector field from said second body, each cycle of said second field having components receivable at said first body and processable to produce at said first body at least five independent measurements from which said first body:

(a) can compute the direction to the second body with respect to the first body coordinate reference frame; and (b) can compute the rotation of said second body coordinate reference frame with respect to said first body coordinate reference frame;

receiving and processing said second field at said first field to produce said five independent measurements;

computing at said first body the direction to the second body with respect to the first body coordinate reference frame; and computing at the first body the rotation of said second body coordinate reference frame with respect to said first body coordinate reference frame.

68. The process as set forth in claim 67 wherein said radiating steps include the step of applying actuating signals to at least two independently oriented magnetic field generating members.

69. The process as set forth in claim 68 which further comprises the step of directing said first and second vector fields toward said second and first bodies, respectively.

70. The process as set forth in claim 69 further comprising the step of determining the distance between said first and second bodies at one of said bodies.

* * * * *